(12) United States Patent
Piazza et al.

(10) Patent No.: US 9,489,162 B2
(45) Date of Patent: Nov. 8, 2016

(54) CONTROL SYSTEM, CONTROL APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Kevin F Piazza, Santa Ana, CA (US); Yasuhiko Hashimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 14/680,965

(22) Filed: Apr. 7, 2015

(65) Prior Publication Data

US 2015/0331639 A1    Nov. 19, 2015

Related U.S. Application Data

(60) Provisional application No. 61/994,731, filed on May 16, 2014.

(51) Int. Cl.
| | |
|---|---|
| *G06K 15/00* | (2006.01) |
| *G06F 3/12* | (2006.01) |
| *G06K 1/00* | (2006.01) |
| *B41J 29/38* | (2006.01) |
| *B41J 29/393* | (2006.01) |
| *G06K 15/02* | (2006.01) |
| *G06F 11/30* | (2006.01) |

(52) U.S. Cl.
CPC ............ *G06F 3/1285* (2013.01); *G06F 3/121* (2013.01); *G06F 3/1203* (2013.01); *G06F 3/1204* (2013.01); *G06F 3/1229* (2013.01); *G06F 3/1234* (2013.01); *G06F 3/1294* (2013.01); *G06F 11/30* (2013.01); *G06K 15/027* (2013.01); *G06K 15/1805* (2013.01)

(58) Field of Classification Search
CPC .................... G03G 15/5062; G03G 15/6588; G06K 15/027; G06K 15/021; G06K 15/4065; H04N 1/6033; H04N 1/6097; H04N 1/00045; H04N 1/00031; H04N 1/00055; H04N 1/00087
USPC .......... 358/1.9, 1.14, 1.15; 347/6, 14, 16, 19
See application file for complete search history.

(56) References Cited

U.S. PATENT DOCUMENTS 6,351,320 B1 * 2/2002 Shin ....................... G06K 15/00
358/1.16

(Continued)

FOREIGN PATENT DOCUMENTS

JP    2013-214269 A    10/2013

*Primary Examiner* — Mohammad Ghayour
*Assistant Examiner* — Jonathan R Beckley
(74) *Attorney, Agent, or Firm* — Canon USA Inc., IP Division

(57) ABSTRACT

A control system that monitors a calibration status of a printer includes the following components. An obtaining unit obtains information that identifies a common media type to be used in calibration by a monitoring-target printer. A first determining unit determines whether a calibration status of the printer satisfies a first condition in accordance with a printing amount of the printer. A second determining unit determines whether a recording medium corresponding to the common media type is held in the printer by using the obtained information. A control unit causes the printer to perform calibration by causing the printer to perform printing on the recording medium corresponding to the common media type in a case where it is determined that the calibration status of the printer satisfies the first condition and that the recording medium corresponding to the common media type is held in the printer.

22 Claims, 24 Drawing Sheets

(56) References Cited

U.S. PATENT DOCUMENTS

| | | | | |
|---|---|---|---|---|
| 6,999,199 B2* | 2/2006 | Degani | | H04N 1/407 348/E5.074 |
| 8,412,055 B2* | 4/2013 | Chandu | | G03G 15/5062 399/15 |
| 9,025,200 B2* | 5/2015 | Sato | | H04N 1/6033 358/1.9 |
| 2012/0206745 A1* | 8/2012 | Shibuya | | H04N 1/6097 358/1.9 |
| 2014/0146331 A1* | 5/2014 | Sato | | H04N 1/6097 358/1.9 |

* cited by examiner

Menu  « Display All | Close Others

Device
 List
Discovery
 Monitoring
 Device Settings
 LFP Calibration
  LFP List
  Create Calibration Monitor
  Manage Calibration Monitors
  Calibration Scheduler
  Calibration Log
  E-mail Log
Computer
System
Report
Task
Configuration
Communication Portal                                                              Home Page | Help | Log Out
                                                                    Login User Name: Administrator Step 3                                                              < Back   Next >   Cancel
Registration Settings of Monitoring Condition Monitoring Condition
 Monitoring Condition Name    East Region LFP's                      (1 to 50 Characters) — 11000
 Comments                     Monitor East Region LFP Calibration Status  ×  (Maximum 50 Characters) — 11001
 Registration Status          ● Register with Start status
                              ○ Register with Stop status
 Monitoring Schedule                                                                            — 11002
  Day                         ☑ Monday ☑ Tuesday ☑ Wednesday ☑ Thursday ☑ Friday ☑ Saturday
                              ☑ Sunday
  Time                        ● 24-hour monitoring
                              ○ Specify monitoring time
                              Time  12 AM ∨  :  00 ∨       12 AM ∨  :  00 ∨                     — 11003

Notification of Monitoring Result
 Regular Format
  ☑ Send by regular format
  E-Mail Addresses to Notify   New:                          Add
                               EastRegion@acme.com                                              — 11004
                                                             Delete Language for E-Mail Notification  English ∨

FIG. 18

Menu — Display All | Close Others

Device
  List
Discovery
Monitoring
Device Settings
LFP Calibration
  LFP List
  Create Calibration Monitor
  Manege Calibration Monitors
  Calibration Scheduler
  Calibration Log —— 18001
  E-mail Log
Computer
System
Report
Task
Configuration
Communication Portal Home Page | Help | Log Out
Login User Name: Administrator Device > LFP Calibration > Calibration Log Calibration Log                                                    To Menu Top  [?]

Calibration Log                                            1-1/1   50 Rows ˅  /1 Page
                                                ⎯⎯ 18002

| Device Nme | Location | Device Status | Date Time |
|---|---|---|---|
| F6300_QA | Store 007 | ● Calibration complete | 4/30/2014 5:01:00 PM |
| F6400-OSD2 | Store 019 | ⊖ Level 2 Warning notification | 4/29/2014 12:03 AM |
| MEL-F6450 | Store 114 | ✖ Waiting for calibration media | 4/28/2014 3:33 PM |

To Menu Top  [?]

CONTROL SYSTEM, CONTROL APPARATUS, CONTROL METHOD, AND NON-TRANSITORY COMPUTER-READABLE STORAGE MEDIUM

This application claims the benefit of U.S. Provisional Application No. 61/994731, filed May 16, 2014, which is hereby incorporated by reference herein in its entirety.

BACKGROUND OF THE INVENTION

Field of the Invention

The present invention relates to a control apparatus, a control method, a control system, and a non-transitory computer-readable storage medium storing thereon a program for keeping colors printed by image forming apparatuses consistent.

Description of the Related Art

An amount of ink ejected by image forming apparatuses such as printers changes due to factors such as aging of the print head. Consequently, colors printed on recording media such as paper may vary even if images are formed based on the same image data. To avoid such variations, so-called calibration is available which enables correction of input image data to print consistent colors on recording media. During calibration, a color patch is printed on a recording medium by the print head, a measurement is performed on the color patch, and a color correction process is performed on input image data based on the measurement result.

Japanese Patent Laid-Open No. 2013-214269 discloses a management system that manages color correction statuses of a plurality of image output apparatuses serving as management targets. According to Japanese Patent Laid-Open No. 2013-214269, a user specifies a media type, and a color-correction-information application status for the specified media type can be presented. Although information indicating whether or not calibration can be performed for each media type is held by each image output apparatus, the user is required to specify a media type which the user has decided to use in calibration from a media type list each time calibration is performed.

SUMMARY OF THE INVENTION

An embodiment provides a mechanism that allows calibration to be performed while minimizing hindrance to work performed by an operator or other users.

A control system that monitors a calibration status of a printer includes an obtaining unit, a first determining unit, a second determining unit, and a control unit. The obtaining unit obtains information that identifies a common media type to be used in calibration by a printer serving as a monitoring target. The printer is capable of using a plurality of media types. A result of calibration performed using the common media type is applied to another media type. The first determining unit determines whether a calibration status of the printer satisfies a first condition in accordance with a printing amount of the printer. The second determining unit determines whether a recording medium corresponding to the common media type is held in the printer by using the information obtained by the obtaining unit. The control unit causes the printer to perform calibration by causing the printer to perform printing on the recording medium corresponding to the common media type in a case where the first determining unit determines that the calibration status of the printer satisfies the first condition and the second determining unit determines that the recording medium corresponding to the common media type is held in the printer.

Further features of the present invention will become apparent from the following description of exemplary embodiments with reference to the attached drawings.

BRIEF DESCRIPTION OF THE DRAWINGS

FIG. 11 is a diagram illustrating an example of a window on which settings for monitoring calibration statuses of printers are set.

FIG. 18 is a diagram illustrating an example of a window showing calibration status notification information and a result of calibration in the system.

DETAILED DESCRIPTION

Figure 1:
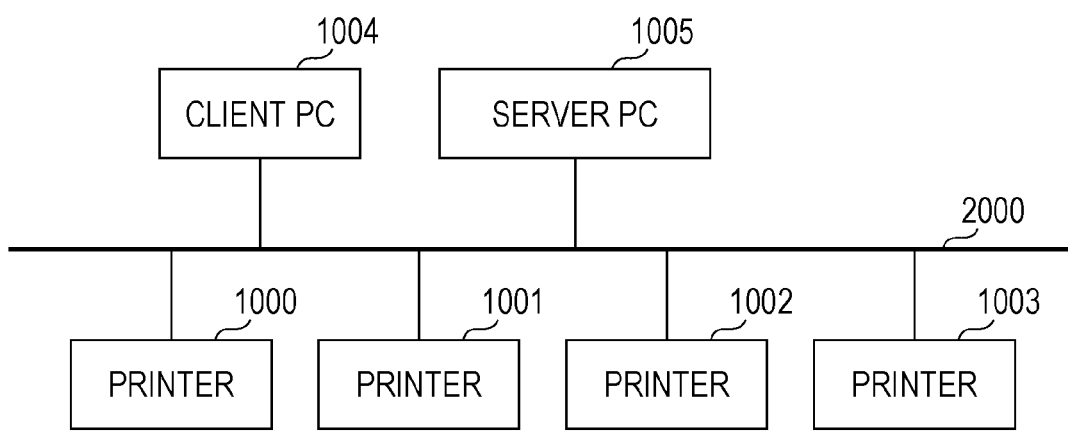
FIG. 1 is a diagram illustrating a network connection configuration of a system.

A system will be described in detail below by using an embodiment. The system disclosed herein is a calibration management system that keeps color tones printed by a plurality of printers installed at respective stores consistent. The system has functions for monitoring calibration statuses of individual printers and remotely performing calibration if necessary. Large-format printers are provided with recording media of a plurality of types for which calibration can be performed. In addition, a user can create custom recording media for which calibration can be performed.

First, the background knowledge will be described. During calibration, a measurement is performed with a density sensor of a printer on colors printed on a recording medium, and characteristics of a print head are determined from the measurement result. Recording media for use in common calibration is a type of recording media that can correctly show a state of ink that has been ejected from the print head. In contrast, it is difficult to correctly perform calibration using other types of recording media having unique features. For this reason, a result of calibration performed using a type of recording media for use in common calibration is used for calibrating other types of recording media having unique features. In this way, color tones are kept consistent to some degree, even on other types of recording media having unique features. This is how common calibration works.

That is, types of recording media used by large-format printers include types for which calibration can be performed and types for which calibration cannot be performed. The types of recording media for which calibration can be performed are further categorized into two sub-types (i.e., a first sub-type and a second sub-type). When calibration is performed for the first sub-type, a result of the calibration is applied to all the other types of recording media. In contrast, when calibration is performed for the second sub-type, a result of the calibration is applied to the type of recording media for which the calibration has been performed. Herein, calibration performed using types of recording media that can serve as the first sub-type is called common calibration, whereas calibration performed using types of recording media that can serve as the second sub-type is unique calibration.

In the case where large-format printers are used in business at respective stores, types of recording media for which calibration can be performed and types of recording media for which calibration cannot be performed are utilized in accordance with contents of services provided at the stores. Accordingly, one type of recording media for which common calibration can be performed is selected from among types of recording media for which calibration can be performed, and calibration is performed. In this way, color tones printed by printers installed at respective stores can be kept consistent, and the operation procedure at the respective stores can be made identical. Examples of media types for which common calibration can be performed include "heavyweight coated paper" and "standard glossy paper", which can be set as a media type for common calibration. In addition, specific examples of media types subjected to unique calibration include "glossy proofing paper (lightweight)" and "matte proofing paper (lightweight)", which can be set as a media type for unique calibration. Note that these media types are merely illustrative, and media types to be used are not limited to these particular types.

Figure 2:
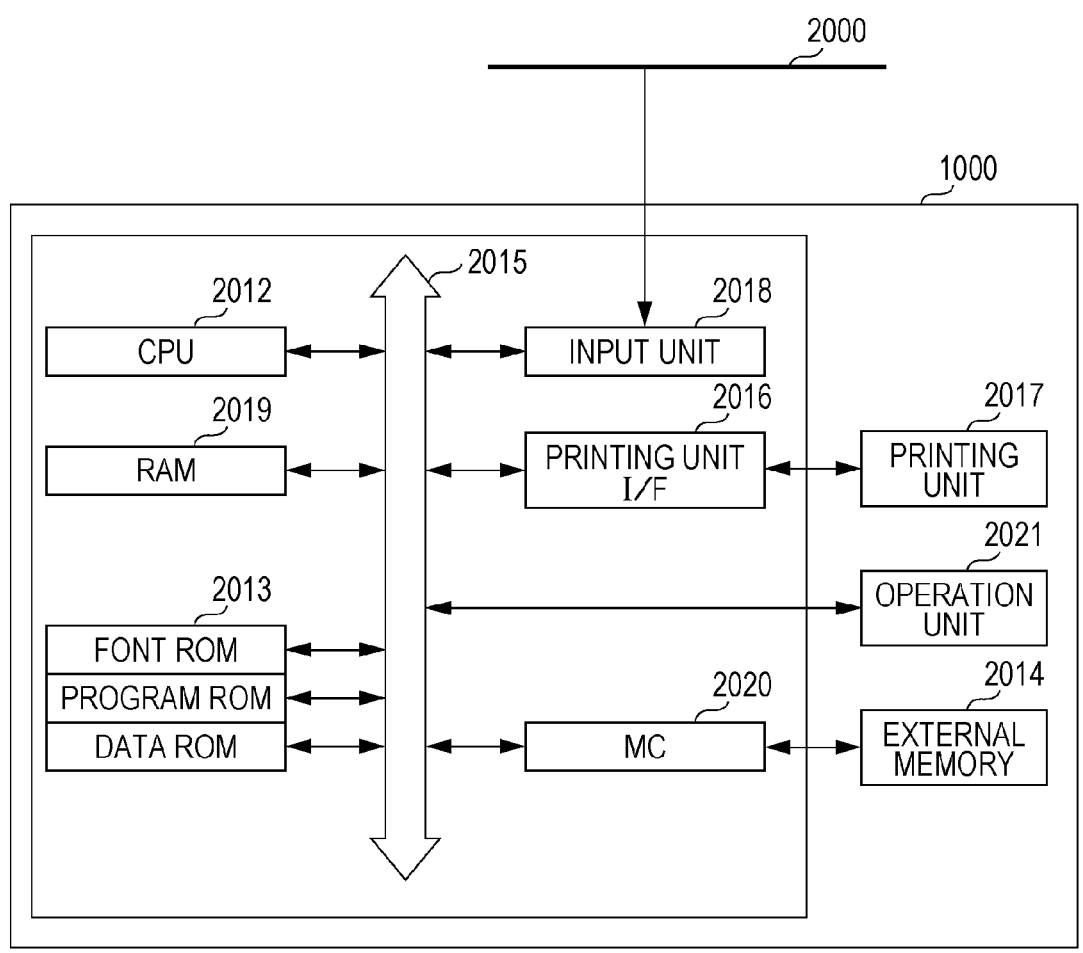
FIG. 2 is a diagram illustrating an example of a hardware configuration of a printer.

FIG. 1 is a diagram illustrating an example of a network connection configuration of the system. The system includes a plurality of printers 1000 to 1003 which are inkjet printers capable of performing large-format printing. A description will be given of the printer 1000 below unless otherwise noted. The printers 1001 to 1003 have similar functions unless otherwise noted. As described above, the printer 1000 handles various types of recording media and has a calibration function. FIG. 2 illustrates a hardware configuration of the printer 1000. A client PC 1004 and a server PC 1005 are also illustrated in FIG. 1. The client PC 1004 and the server PC 1005 each have a hardware configuration illustrated in FIG. 3. The server PC 1005 has a web server function and includes various modules described in FIG. 4. The client PC 1004 includes a web browser and application programs. The web browser communicates with a web server of the server PC 1005 and displays user interfaces (described below with reference to FIGS. 8 to 18) on a display of the client PC 1004. In response to an instruction from the client PC 1004 or an instruction from an operator of the server PC 1005, the server PC 1005 searches for the printers 1000 to 1003 by using a protocol such as Simple Network Management Protocol (SNMP) or a certain management protocol and stores a list of responses from the plurality of printers found through the search. The server PC 1005 is also capable of outputting an instruction for calibration to the printers 1000 to 1003 in accordance with a certain management protocol in response to an instruction from the client PC 1004 or an instruction from an operator of the server PC 1005.

FIG. 2 is a diagram illustrating an example of a hardware configuration of the printer 1000. Note that the printers 1001 to 1003 also have the similar configurations. The printer 1000 is controlled by a central processing unit (CPU) 2012. The CPU 2012 operates in accordance with a control program stored in a program read-only memory (ROM) of a ROM 2013 or a control program stored in an external memory 2014. The CPU 2012 outputs, via a system bus 2015, an image signal which serves as output information to a printing unit (printer engine) 2017 which is connected to a printing unit interface (I/F) 2016. A font ROM of the ROM 2013 stores font data used on a panel or in print data. A data ROM of the ROM 2013 stores various kinds of data such as data of menu items displayed by an operation unit 2021, default data of setting values set on individual menus, and parameter data necessary for operation of the printing unit 2017. The program ROM of the ROM 2013 stores programs such as the control program for the CPU 2012.

The CPU 2012 performs a process for communicating with the client PC 1004 and the server PC 1005 via an input unit 2018 and thus notifies the client PC 1004 and the server PC 1005 of internal information of the printer 1000. A random access memory (RAM) 2019 functions as a main memory and a work area of the CPU 2012, for example. A capacity of the RAM 2019 can be expanded by an optional RAM that is connected to an add-on port (not illustrated). The RAM 2019 is used as an output information rendering area, an environmental data storage area, and a non-volatile RAM (NVRAM), for example. A memory controller (MC) 2020 controls access to the external memory 2014 such as a hard disk drive (HDD) or an integrated circuit (IC) card. The external memory 2014 can be optionally connected and stores font data, emulation programs, form data, information regarding custom paper, paper attribute information, and so on. The input unit 2018 accepts an input made using buttons or the like. The operation unit 2021 includes a panel and is capable of displaying various types of information.

Figure 3:
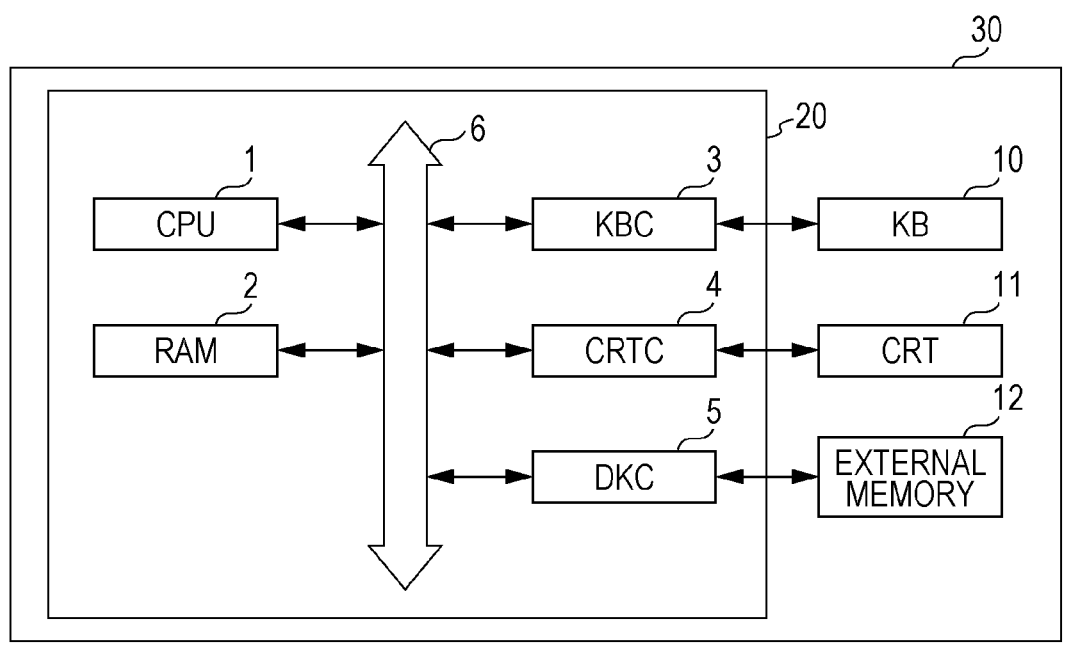
FIG. 3 is a diagram illustrating an example of a server personal computer (PC).

FIG. 3 is a block diagram illustrating an exemplary configuration of the server PC 1005. In a main unit 20 included in a computer 30 which is the server PC 1005, a CPU 1 loads various programs such as a control program, a system program, and application programs from an external memory 12 into a RAM 2 via a disk controller (DKC) 5 and executes the various programs to perform various data processing processes. The computer 20 also includes a ROM (not illustrated) and may load the control program from the ROM. The CPU 1 may be a dedicated circuit such as an application specific integrated circuit (ASIC). The CPU 1 or the dedicated circuit is an example of a hardware circuit or a hardware processor. The DKC 5 controls access to the external memory 12 such as a flexible disk (FD), an HDD, a compact disc read-only memory (CD-ROM), a mini disk (MD), or a magneto-optical disk (MO). A capacity of RAM 2 can be expanded by an optional RAM (not illustrated) or the like. The RAM 2 is used mainly as a work area of the CPU 1. A keyboard controller (KBC) 3 controls a key input from a keyboard (KB) 10 or a pointing device (not illustrated). A cathode ray tube (CRT) controller (CRTC) 4 controls display performed by a CRT display (CRT) 11. In the embodiment of the present invention, the CPU 1 controls the RAM 2, the KBC 3, the CRTC 4, and the DKC 5 via a main bus 6 unless otherwise noted. In the system, a user opens a user interface (UI) of an application or a device driver and changes a setting. Then, a host computer accepts the user input from the KB 10 or a pointing device (not illustrated) and displays the status and the progress on the CRT 11. For example, a calibration management unit 1110 of the server PC 1005 illustrated in FIG. 4 can be configured as a program module. For example, the calibration management unit 1110 is stored in the external memory 12 such as an FD, an HDD, a CD-ROM, an MD, or an MO of the server PC 1005. The calibration management unit 1110 is loaded into the RAM 2 and is executed and controlled by the CPU 1 of the server PC 1005.

The client PC 1004 has a hardware configuration similar to that of FIG. 3. For example, a media information management unit 1109 of the client PC 1004 illustrated in FIG. 4 can be configured as a program module. For example, the media information management unit 1109 is stored in the external memory 12 such as an FD, an HDD, a CD-ROM, an MD, or an MO of the client PC 1004. The media information management unit 1109 is loaded into the RAM 2 of the client PC 1004 and is executed and controlled by the CPU 1 of the client PC 1004.

Figure 4:
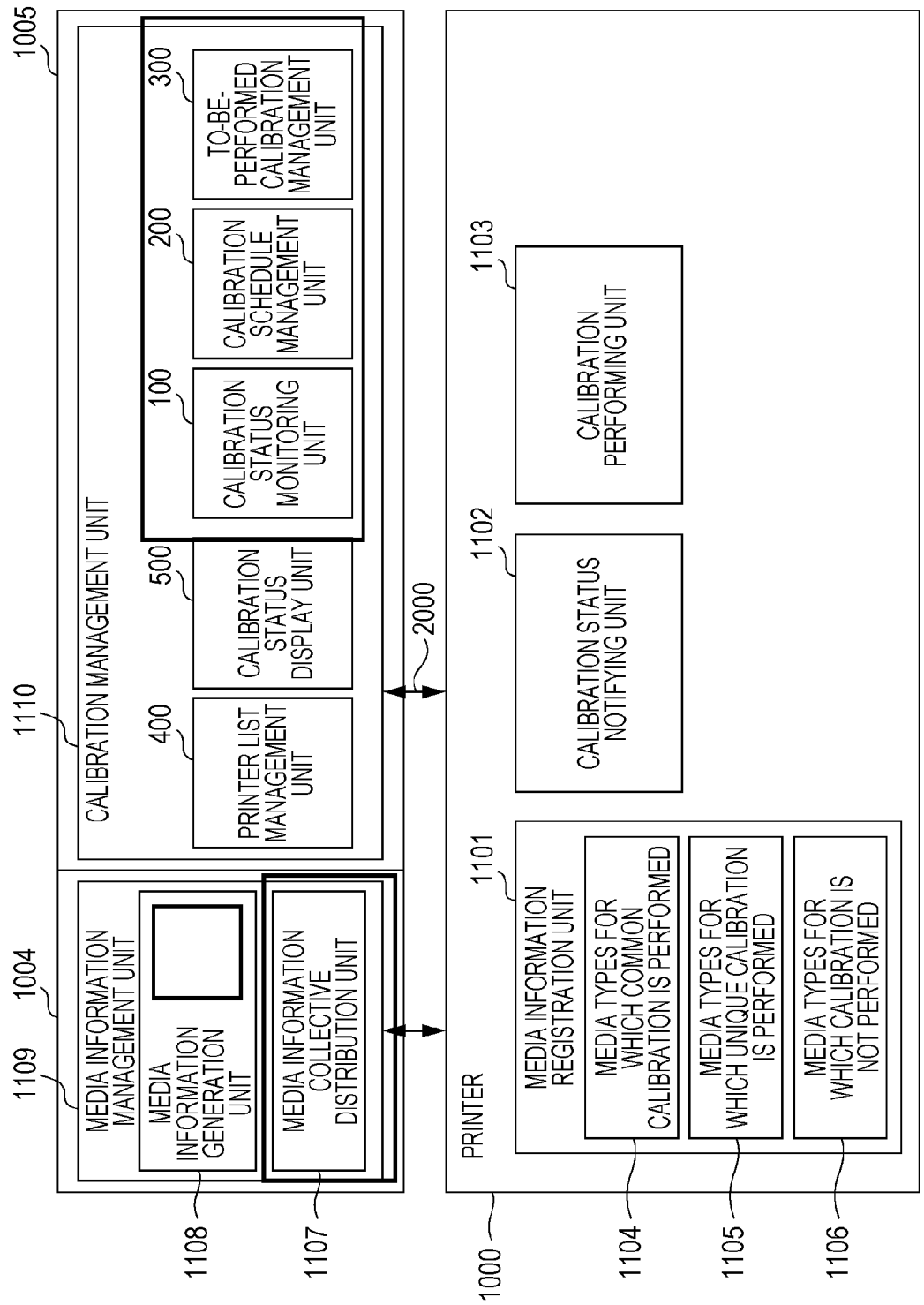
FIG. 4 illustrates an example in which functional modules of a client PC and functional modules of the server PC are implemented by different PCs.

FIG. 4 is a diagram illustrating an example of functional blocks of the system. As described above, the client PC 1004 includes the media information management unit 1109. The media information management unit 1109 includes a media information generation unit 1108 and a media information collective distribution unit 1107. The media information generation unit 1108 manages a media type for which common calibration can be performed and which will be described later. The media information collective distribution unit 1107 distributes, to the plurality of printers 1000 to 1003, information regarding the set media type for which common calibration can be performed, information regarding media types for which unique calibration can be performed, and information regarding media types for which calibration cannot be performed.

The information that is distributed by the media information collective distribution unit 1107 via a network 2000 is obtained and stored by a media information registration unit 1101 of the printers 1000 to 1003.

The server PC 1005 includes the calibration management unit 1110. The calibration management unit 1110 includes a printer list management unit 400, a calibration status monitoring unit 100, a calibration schedule management unit 200, a to-be-performed calibration management unit 300, and a calibration status display unit 500. The printer list management unit 400 manages a list of printers. The calibration status monitoring unit 100 monitors calibration statuses of the printers 1000 to 1003. The calibration schedule management unit 200 manages a schedule of calibration. The to-be-performed calibration management unit 300 manages calibration to be performed. The calibration schedule management unit 200 allows whether calibration is to be performed based on a schedule or manual specification. The calibration status monitoring unit 100 obtains calibration statuses from the respective printers 1000 to 1003. The calibration status display unit 500 then generates display information by using a language such as hyper text markup language (HTML) or extensible markup language (XML) in accordance with the obtained calibration statuses.

The calibration status display unit 500 transmits the display information to the web browser of the client PC 1004 in response to a request from the web browser. Based on the display information, the web browser controls display performed by the CRT 11 of the client PC 1004. Note that the CRT 11 is merely an example of a display unit, and the display unit is not limited to this particular device.

The printer 1000 has the following functions. A calibration status notifying unit 1102 determines, for each type of recording media, a calibration status and notifies the calibration status monitoring unit 100 of the determined calibration status. A calibration performing unit 1103 performs calibration by using a recording medium that is being fed. The calibration is performed in response to an instruction from a panel of the printer 1000 or an instruction from remote software installed in the client PC 1004 or the server PC 1005. The media information registration unit 1101 functions as described above. The media information registration unit 1101 has information 1104 regarding media types for which common calibration is performed (common calibration media types), information 1105 regarding media types for which unique calibration is performed (unique calibration media types), and information 1106 regarding media types for which calibration is not performed.

FIG. 4 illustrates an example in which functional modules of the client PC 1004 and functional modules of the server PC 1005 are implemented by different PCs. In another embodiment, all the functional modules may reside on a single PC.

Figure 5:
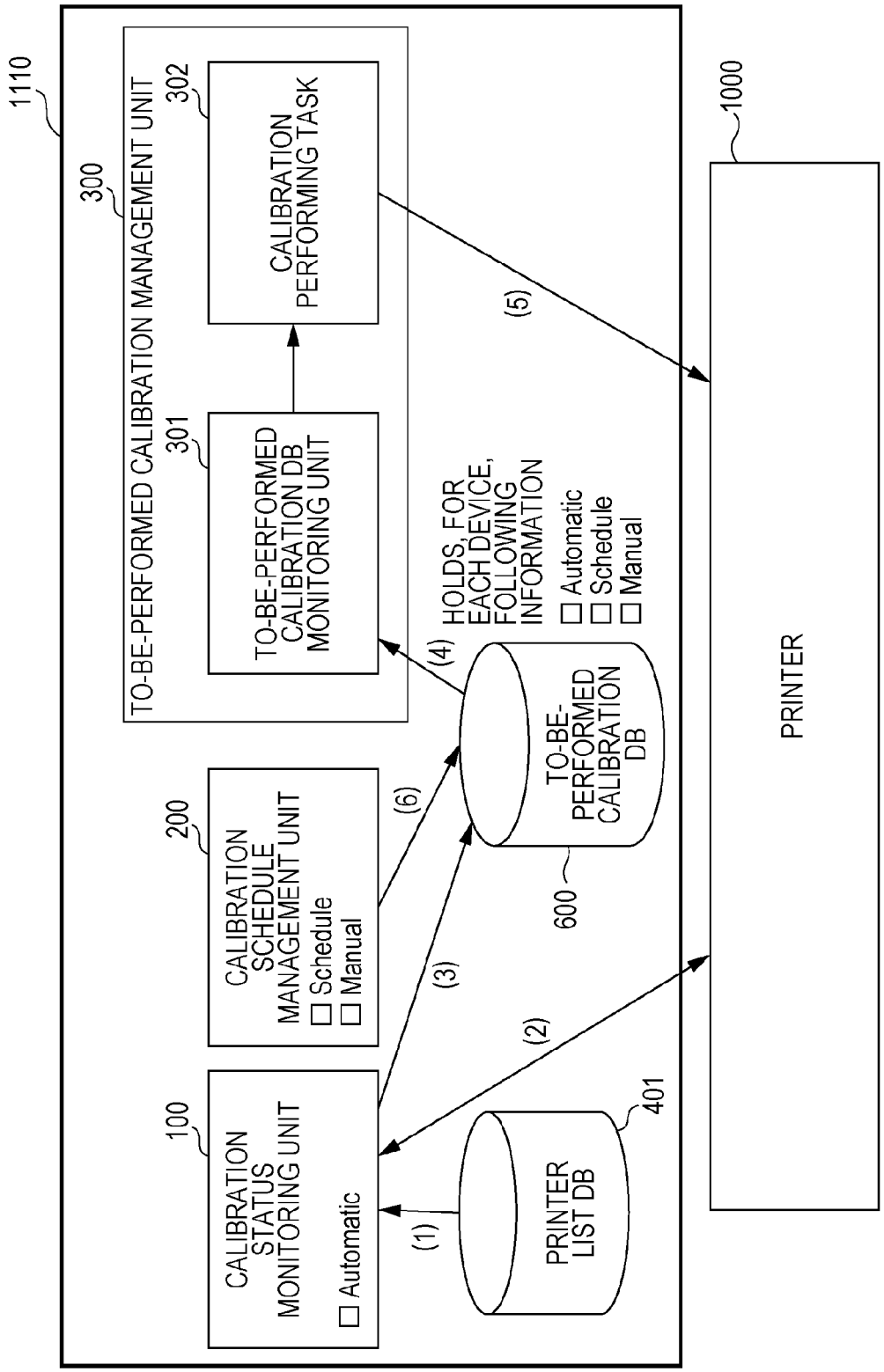
FIG. 5 is a block diagram illustrating an example of details of a calibration management unit.

FIG. 5 is a block diagram illustrating an example of details of the calibration management unit 1110. A flow illustrated in FIG. 5 is as described below.

The calibration status monitoring unit 100, in (1), obtains, from a printer list database (DB) 401 included in the printer list management unit 400, various pieces of information regarding printers serving as monitoring targets (such as the printers 1000 to 1003 ).

The calibration status monitoring unit 100, in (2), obtains the statuses for media for common calibration from the printers 1000 to 1003 and determines a level. A user or an administrator may define which process (such as notification by e-mail, calibration, or nothing) is to be performed at each level. In this embodiment, the default setting is notification (see FIG. 10).

In the case of Level 3, the calibration status monitoring unit 100, in (3), sets, in a to-be-performed calibration DB 600, information indicating that calibration needs to be performed in the printer.

If a printer for which calibration needs to be performed is found in the to-be-performed calibration DB 600, a to-be-performed calibration DB monitoring unit 301, in (4), generates a calibration performing task 302 for the printer. It is assumed here that the calibration performing task 302 is generated for the printer 1000.

The calibration performing task 302, in (5), communicates with the printer 1000 and detects, at regular intervals, whether a medium for common calibration is fed. When a medium for common calibration is fed, the calibration performing task 302 gives an instruction for performing calibration to the printer 1000 that corresponds to the calibration performing task 302. Here, the state "a medium is fed" refers to a state where the medium is held by a sheet feeder of the printer 1000.

The calibration schedule management unit 200, in (6), writes, for each printer, to the to-be-performed calibration DB 600, information (Schedule) indicating that scheduled calibration is to be performed (only once) and information (Manual) indicating that calibration is to be performed manually (immediately), independently of automatically performing calibration according to steps (1) to (5), described above. Upon finding information of "Automatic", "Schedule", or "Manual", the to-be-performed calibration DB monitoring unit 301 generates the calibration performing task 302 for the printer.

The calibration management system monitors the calibration status and, if necessary, remotely performs calibration by using a recording medium of a type for which common calibration can be performed and that has been selected as a type used in common at individual stores. An example of a series of operations performed by the system will be described.

Setup Phase

Figure 6:
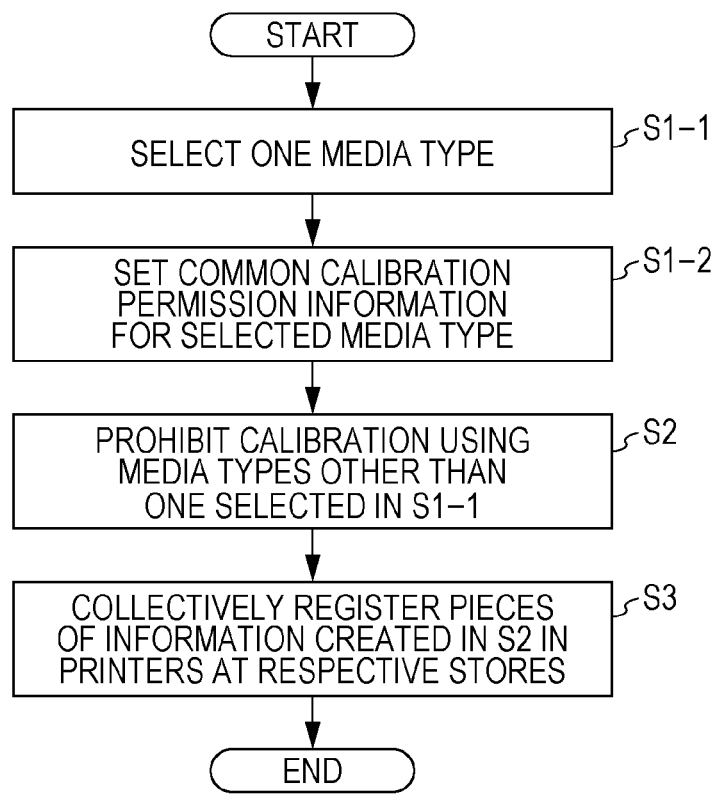
FIG. 6 is a diagram illustrating an example of a setup control flow.

In a setup phase, a configuration regarding media types is made for operations by using a media information management tool to register the configuration in the printers 1000 to 1003 installed at respective stores. The following is the processing performed using the media information management tool. Note that the media information management tool corresponds to the media information management unit 1109 illustrated in FIG. 4. FIG. 6 is a diagram illustrating a setup control flow. The CPU 1 of the client PC 1004 loads a control program stored in the external memory 12 into the RAM 2 and executes the control program. In this way, the setup control is performed.

In S1-1, one media type used for common calibration is selected from among media types. In S1-2, common calibration permission information is set for the selected media type.

The tool represented as the media information management unit 1109 is started. Then, [Add and Edit Custom Paper] is performed from the initial window (Add Genuine Paper/Edit Paper, Add and Edit Custom Paper). Then, a window illustrated in FIG. 21 (including buttons 2101, 2102, 2103, 2104, and 2105 respectively for adding, editing, deleting, importing, and exporting custom paper) opens.

Figure 21:
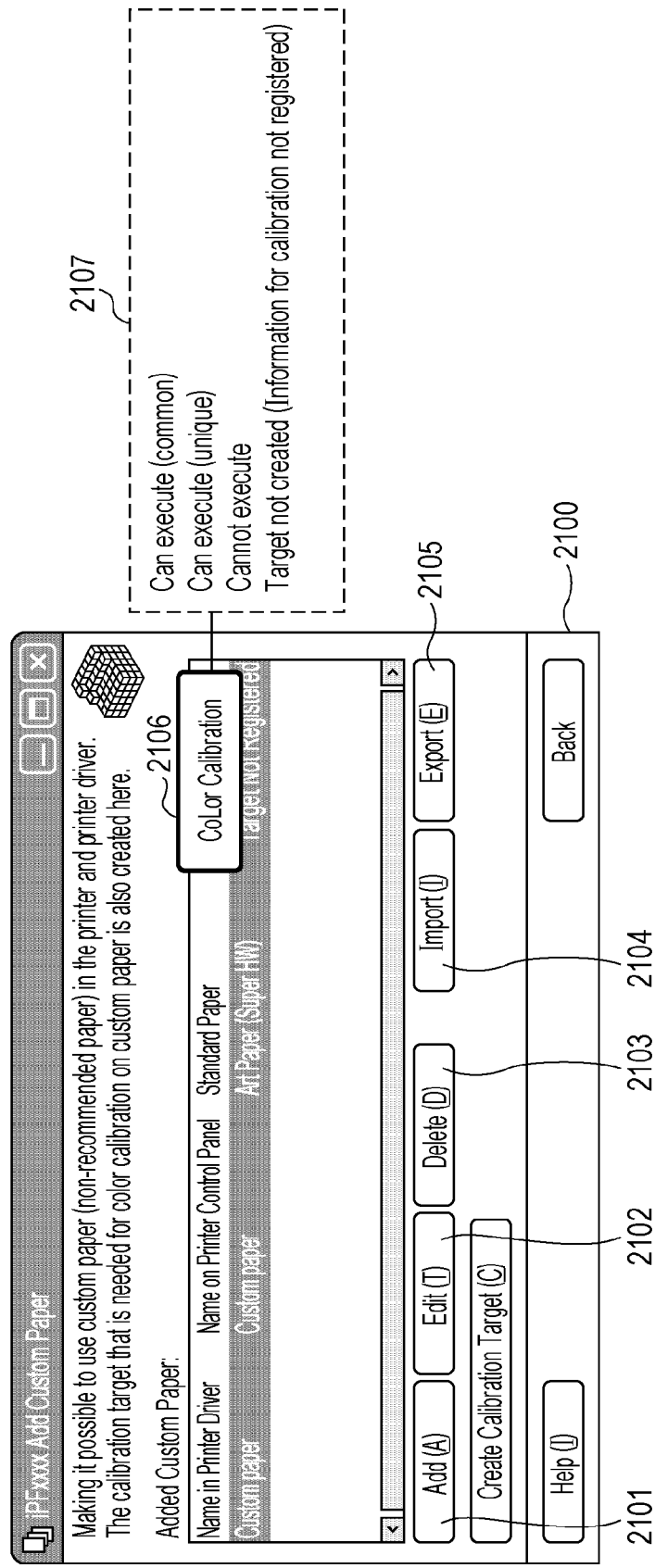
FIG. 21 is a diagram illustrating an example of a window on which various calibration settings are set.

The information illustrated in FIG. 21 shows the display name of custom paper in the printer driver and on the printer control panel and the name of standard paper. In addition, an attribute 2107 indicating whether common calibration can be performed is displayed. Here, "Can execute (common)" indicates that paper can be used in common calibration. "Can execute (unique)" indicates that paper can be used in unique calibration. "Cannot execute" indicates that paper cannot be used in calibration. "Target not created" indicates that paper can be used in calibration (common calibration or unique calibration) but is not used in calibration because a calibration target value has not been created.

After addition of custom paper has been performed on the window illustrated in FIG. 21, a procedure for creating the custom paper is performed step by step. Steps for creating custom paper are as follows:

(1) Select the standard paper;
(2) Input the name of the custom paper;
(3) Display a window instructing a user to load the custom paper to the printer;
(4) Perform printing to adjust a feed rate of the custom paper;
(5) Configure roll paper attributes (such as specification of automatic cutting, ink drying time, and borderless printing);
(6) Configure the maximum amount of ink to be ejected, the height of the print head, and the vacuum strength; and
(7) Register the paper in the printer driver or printer. Note that a window illustrated in FIG. 22 is displayed in step (6).

Figure 7:
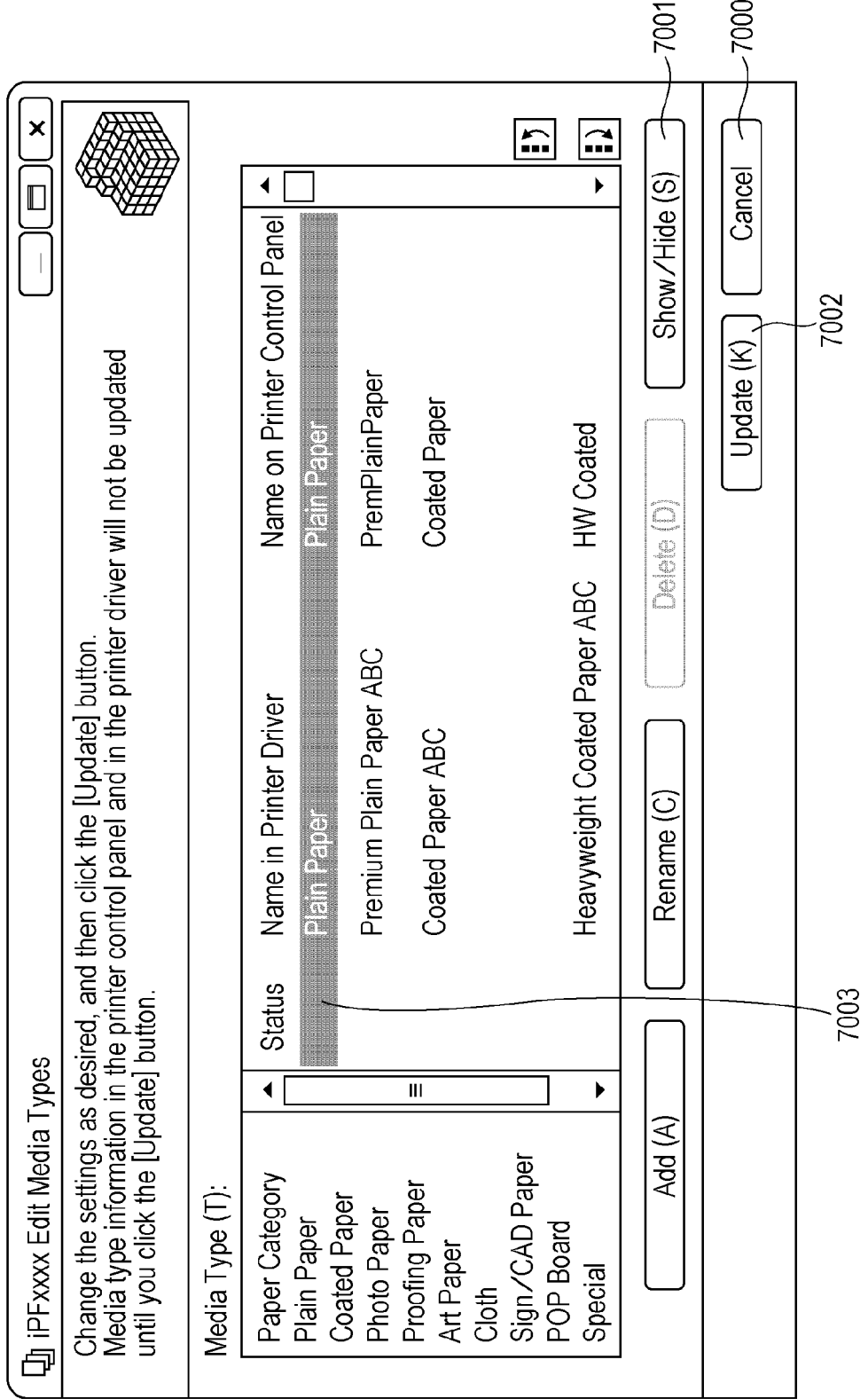
FIG. 7 is a diagram illustrating an example of a window on which a media type for which calibration is to be performed is set.
Figure 22:
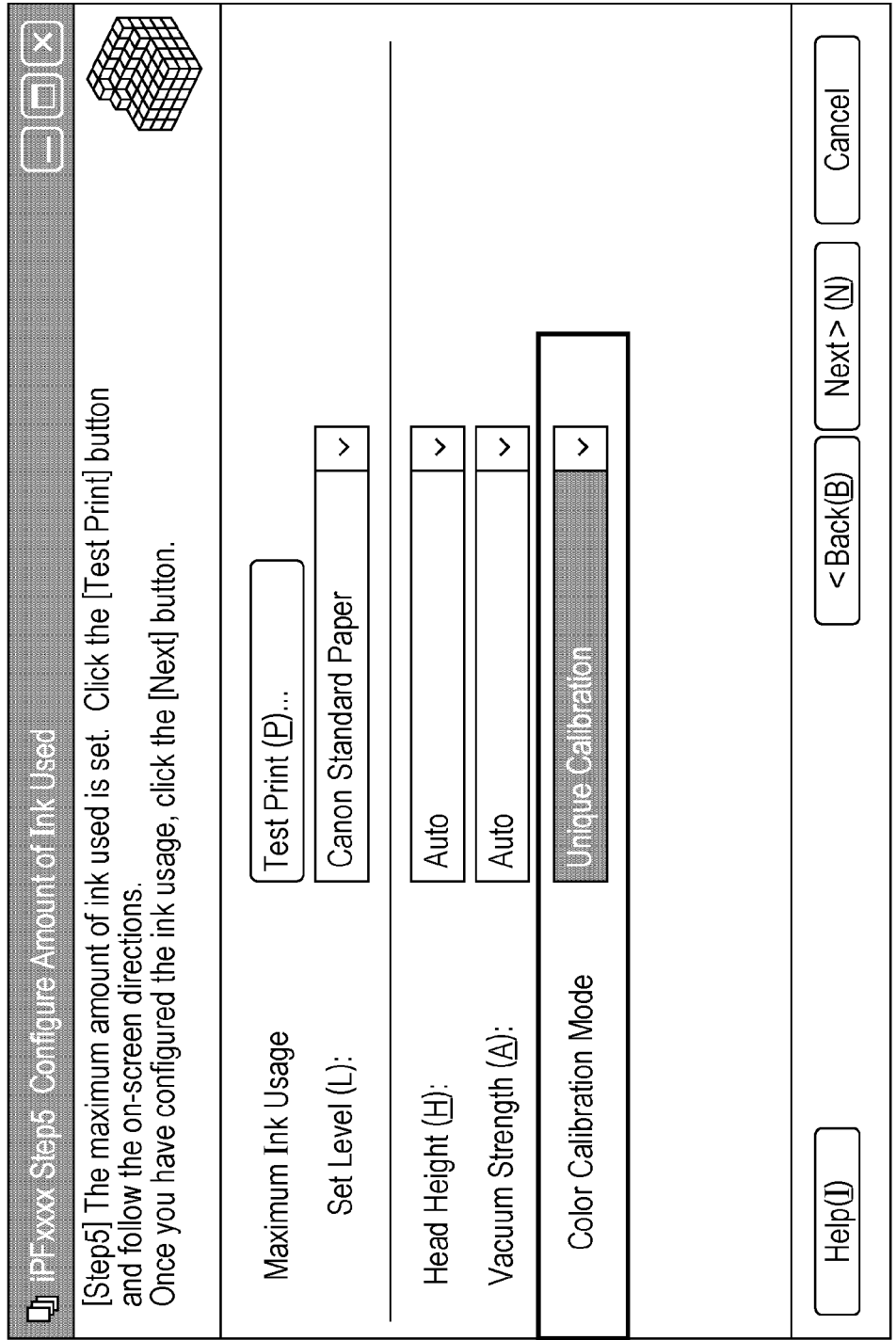
FIG. 22 is a diagram illustrating an example of a window on which an amount of ink used in calibration is set.

Referring to FIG. 22, options are displayed at a [Color Calibration Mode] selection field 2201. FIG. 22 is a window that enables setting of an amount of ink used in calibration. Here, an attribute of the paper such as unique calibration or common calibration can be set. The attributes specified on this window are reflected in a display field 2106 of FIG. 21. If an instruction to register or update is given, after inputs have been performed on the various setting windows such as those illustrated in FIG. 21 and FIG. 7, the specified attributes are registered as information concerning the selected custom paper by the media information management tool. FIG. 7 is a setting window for setting the media type for which calibration is performed. FIG. 21 is a window for setting various settings regarding media information subjected to calibration. Then, the information is registered in the printer driver or printer. For example, if a user presses an [Update] button 7002 on the window illustrated in FIG. 7, an update target confirmation window (FIG. 23) is displayed. If a user presses a [Cancel] button 7000 on the window illustrated in FIG. 7, media type information is not updated and the setting window closes. If a user presses an [Execute] button 2302 on the window illustrated in FIG. 23, the information is registered in the printer driver or printer. The information concerning the custom paper can be exported and imported by using the buttons 2105 and 2104, respectively. A selection section 2303 allows selection of the update target. In this embodiment, either "Update the printer control panel and printer driver" or "Update the printer driver only" can be selected. When the information is imported by using the button 2104, the information is transmitted to the printer 1000 and is registered in a memory of the printer 1000. For example, media information to be registered in the printers 1000 to 1003 may be displayed on a panel of the printers 1000 to 1003 or a UI of the client PC 1004 by using the tool represented as the media information management unit 1109.

A calibration target value is held as media information by the media information management unit 1109. In addition, the printer has calibration target values for media types for which calibration can be performed among media types registered in the printer in advance. Note that the configuration is not limited to this one, and the media information collective distribution unit 1107 may distribute media information managed by the media information management unit 1109 to each printer so that calibration target values are registered in the printer for respective media types.

Here, a user of the client PC 1004 selects a media type or one of various types of custom media as indicated by a shade 7003 in FIG. 7 and clicks a [Show/Hide] button 7001 by using a mouse or the like. Through the [Show/Hide] button 7001, an instruction to show or hide the various types of recording media is selected using the media information management tool.

Note that information indicating whether or not custom paper can be used in common calibration may be displayed for each type of custom paper in FIG. 7. Further, a warning may be output upon detection of setting of a plurality of types of custom paper that can be used in common calibration, and that are displayed in a printer. With this function, control can be performed to enable a setting in which only one media type for common calibration is displayed among media types displayed on the panels of the printers 1000 to 1003 or the UI of the client PC 1004.

Referring to FIG. 21, the button 2101 is a button used to start defining new custom paper, and the button 2103 is a button that enables deletion of information concerting defined custom paper.

Referring back to FIG. 6, in step S2, information indicating unique calibration is set as a value of the display field 2106 in FIG. 21 for media types other than the media type selected in S1-1. That is, media types other than the selected media type are set as media types that cannot be used in common calibration. In the case where a media type that cannot be used in calibration is selected as the standard paper in (1) of selecting the standard paper, the field 2201 illustrated in FIG. 22 is made not selectable. Alternatively, information indicating that calibration cannot be performed may be made selectable at the field 2201 illustrated in FIG. 22 even in the case of media types that can be used in calibration.

Figure 23:
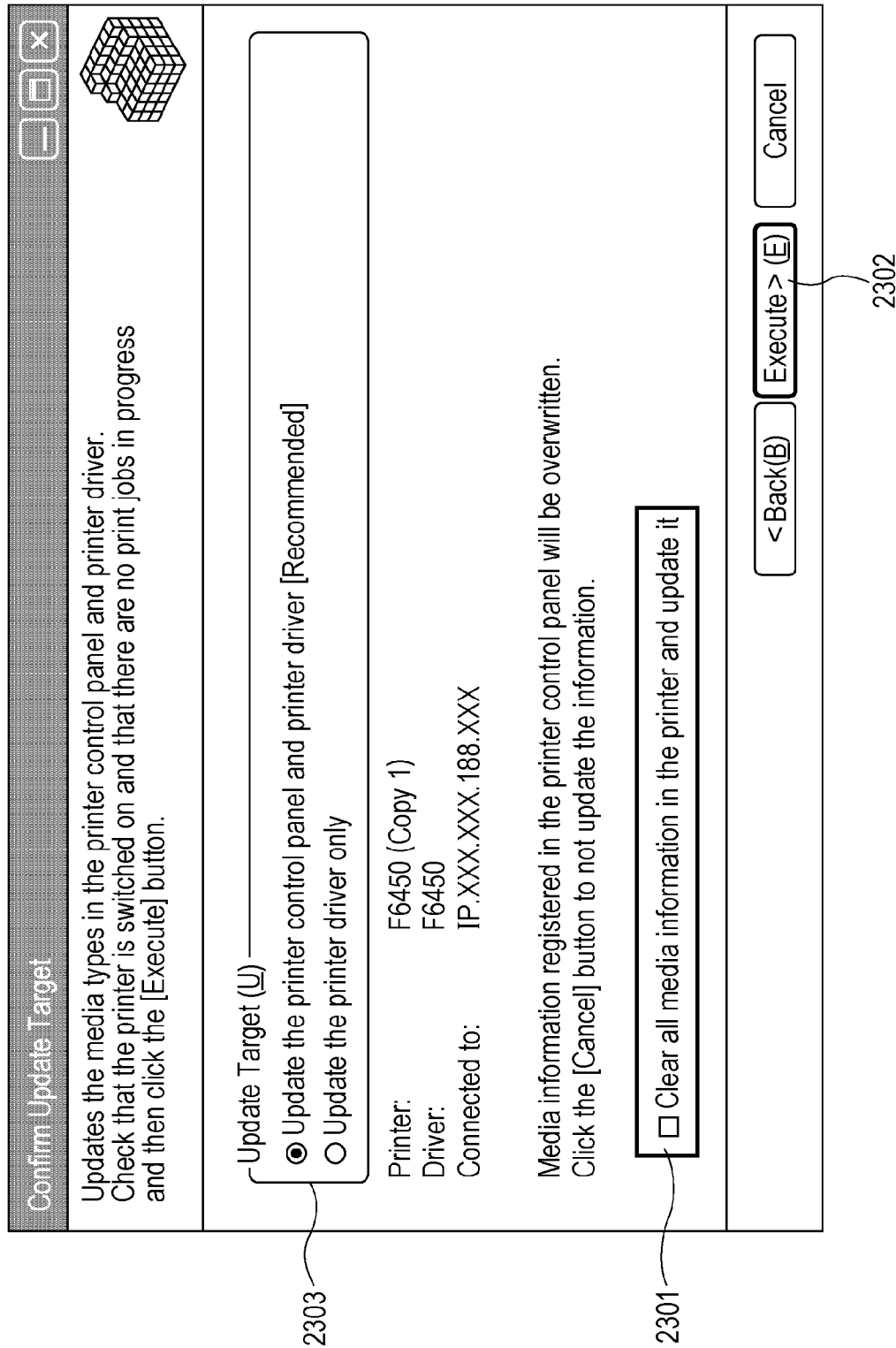
FIG. 23 is a diagram illustrating an example of a window with which media information is updated.

In step S3, in response to pressing of the [Update] button 7002 illustrated in FIG. 7, an update target confirmation window illustrated in FIG. 23 opens. On this window, information concerning all media types including information concerning custom paper created to be registered in the printers 1000 to 1003 can be registered in the printers 1000 to 1003. Further, in the case where the information concerning all media types is collectively distributed to a plurality of printers, the media information collective distribution unit 1107 illustrated in FIG. 4 collectively registers this information in the printers 1000 to 1003 installed at the respective stores via the network 2000.

Media types registered in the printers 1000 to 1003 installed at the respective stores are set as media types used at the stores as a result of the steps S1-1 to S3 being performed by using the media information management tool. The setting regarding the media types in the printers 1000 to 1003 used at the respective stores allows for only setting one media type to be used in common calibration among media types displayed on the panels of the plurality of printers 1000 to 1003.

Settings in Operation Phase

In an operation phase, the calibration status for one media type that has been registered in the printers 1000 to 1003 installed at the respective stores and that can be used in common calibration is monitored using the calibration management system. The following control is performed as a result of the CPU 1 of the server PC 1005 loading a control program stored in the external memory 12 into the RAM 2 and executing the control program.

In the operation phase, settings used in monitoring of the printers 1000 to 1003 installed at the respective stores are set by using the calibration management system in the following manner.

Figure 24:
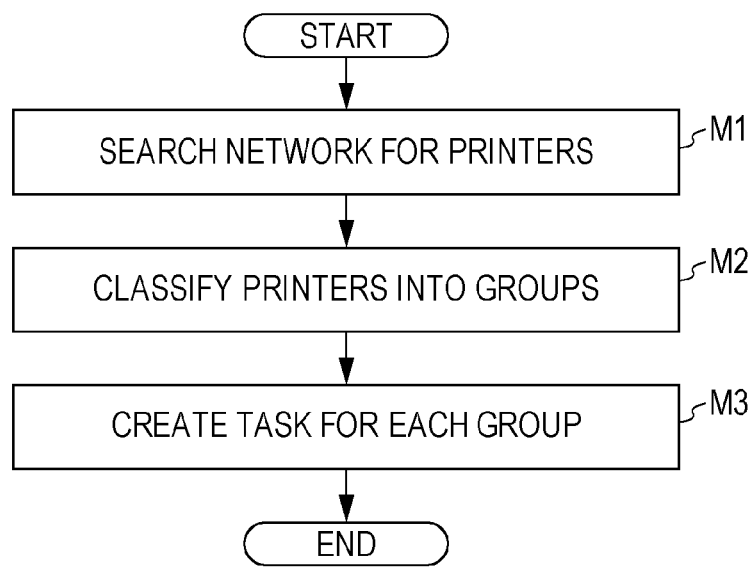
FIG. 24 is a diagram illustrating an example of a set flow for monitoring printers.

A process starts in response to a timer event or a search instruction given to the printer list management unit 400. In step M1 in FIG. 24, the printer list management unit 400 searches the network 2000 for the printers 1000 to 1003 installed at the respective stores. Information concerning the plurality of printers is obtained by the printer list management unit 400 and is stored in the external memory 12 of the server PC 1005 or the like.

Figure 8:
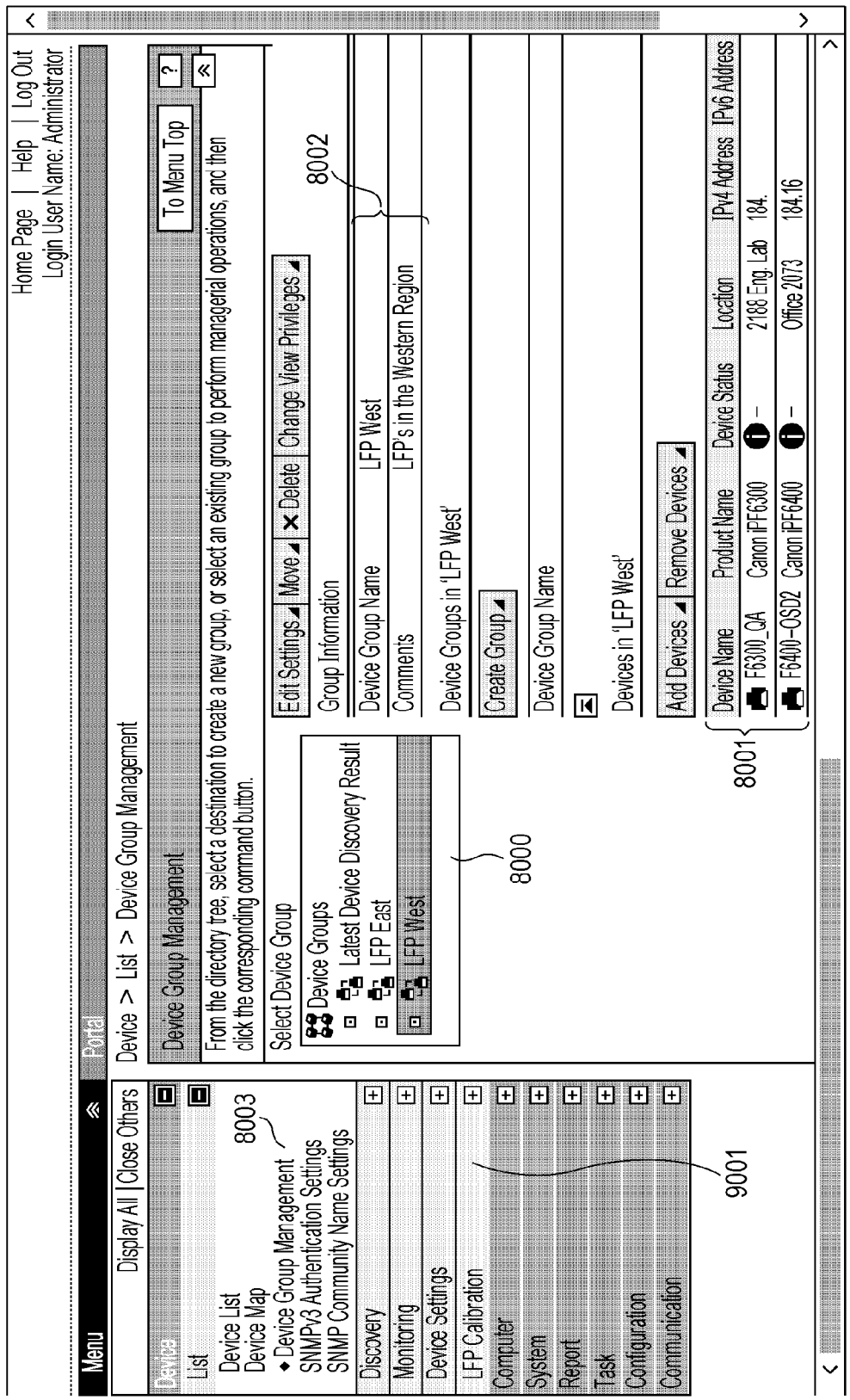
FIG. 8 is a diagram illustrating an example of a printer management window used in the system.

In step M2, if a device group management menu 8003 (see FIG. 8) is selected, a group is created for each area where stores are located, and then the printers 1000 to 1003 found through the search in step M1 are each classified into a corresponding one of groups. The printer list management unit 400 registers the printers each classified into a corresponding one of groups. FIG. 8 is a window on which the printers 1000 to 1003 are managed using groups in the system. For example, in FIG. 8, groups are formed for an area LFP East and an area LFP West, and a plurality of printers are each registered in a corresponding one of the groups. A field 8000 displays defined groups. At a group information section 8002, a group name and a comment can be defined and displayed. A section 8001 displays information concerning two printers (herein, large-format inkjet printers) registered in the group LFP West.

Figure 9:
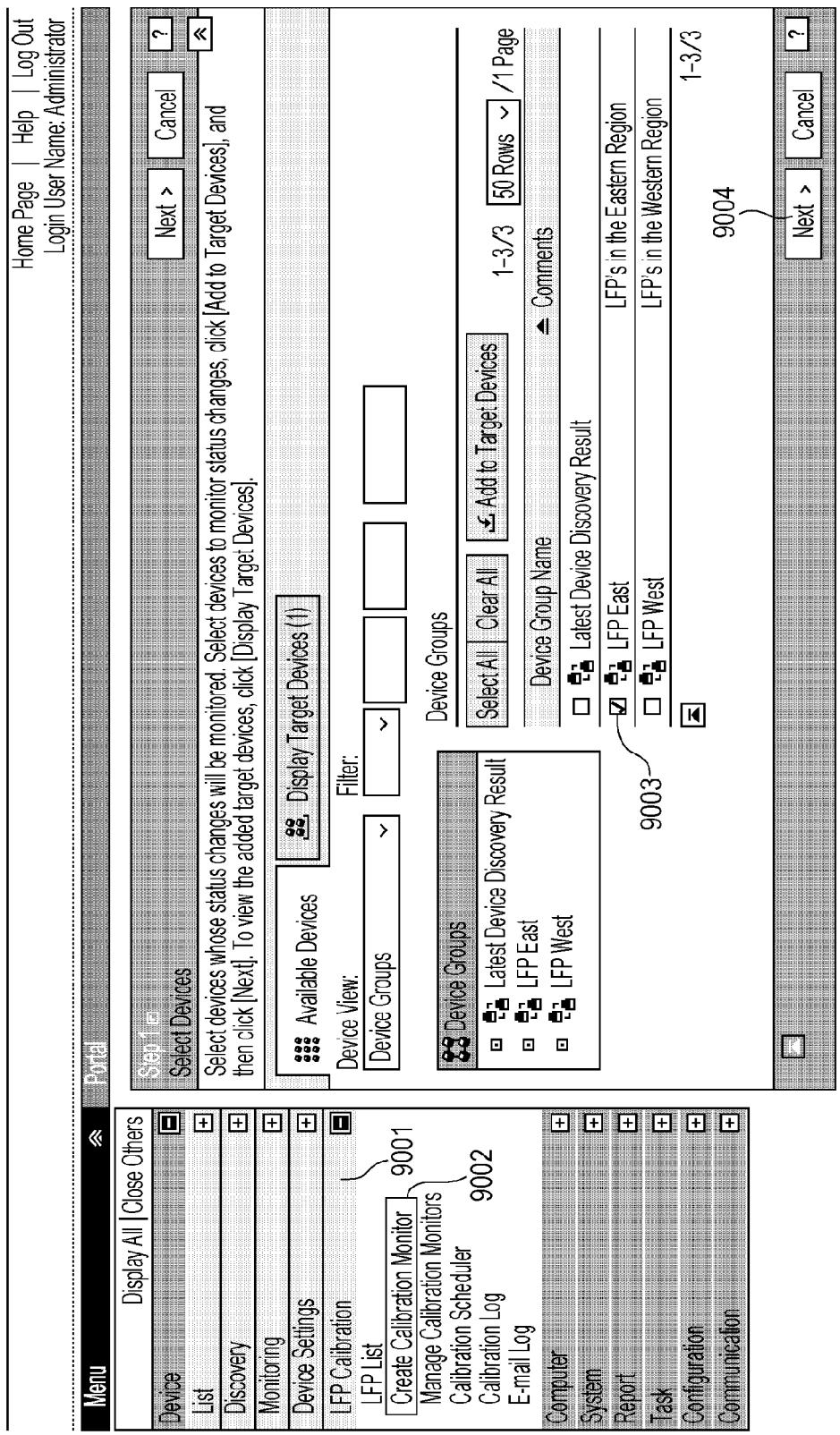
FIG. 9 is a diagram illustrating an example of a window on which settings for monitoring calibration statuses of printers are set.
Figure 10:
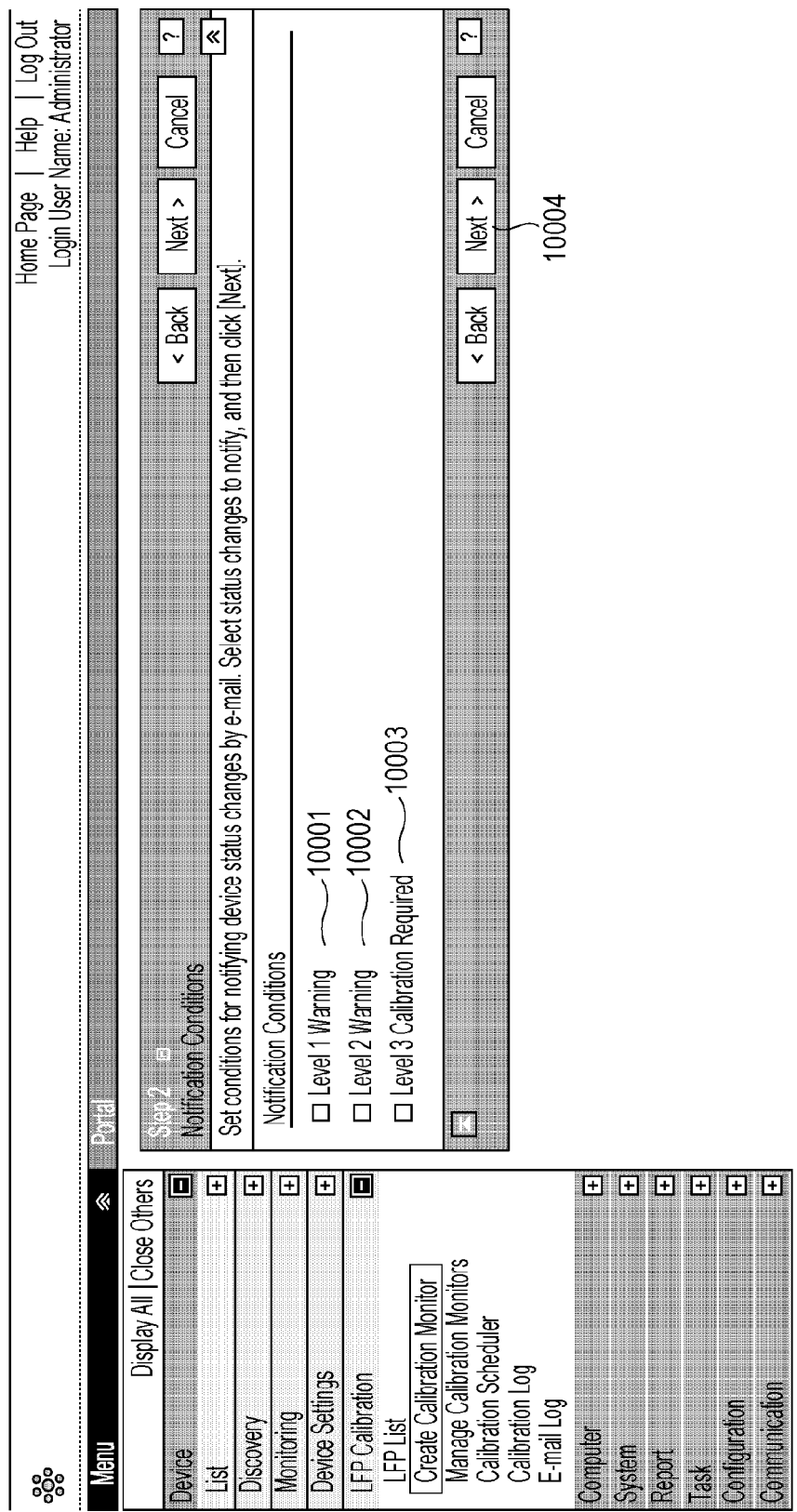
FIG. 10 is a diagram illustrating an example of a window on which settings for monitoring calibration statuses of printers are set.

In step M3, calibration status monitoring unit 100 creates a task for each group. The calibration status monitoring unit 100 monitors the calibration statuses of the printers 1000 to 1003 that belong to the corresponding group all the time. If a user presses an LFP calibration tab 9001 illustrated in FIG. 8, the window changes to a window illustrated in FIG. 9. FIG. 9 is a window on which settings for monitoring the calibration statuses of printers are set. In response to selection of a menu "Create Calibration Monitor" 9002, a device selection window is displayed. Here, the device group LFP East is selected by selecting a checkbox 9003. If the user presses a [Next] button 9004, the window changes to a window illustrated in FIG. 10. FIG. 10 is a window on which settings for monitoring the calibration statuses of the printers are set. As described below, the calibration status monitoring unit 100 determines one of levels on the basis of information obtained from one or more printers that belong to a device group corresponding to a calibration monitoring task. The levels include Level 1, Level 2, and Level 3. The calibration status monitoring unit 100 accepts a user input and specifies what message is to be transmitted by the calibration status monitoring unit 100 to the destination (described later) in the case of each level. Herein, a message transmitted at Levels 1 and 2 indicates a warning, whereas a message transmitted at Level 3 indicates that calibration is required.

On the window illustrated in FIG. 10, whether or not to output a notification by e-mail after the calibration status has been detected by each calibration monitoring task is specified for individual calibration statuses of Level 1, Level 2, and Level 3 with checkboxes 10001, 10002, and 10003, respectively. In this embodiment, a notification is output by e-mail at Level 1 and Level 2, and this notification serves as notification information that allows an operator at the store to determine whether or not to perform calibration directly from a printer control panel when it is convenient for store operations. At Level 3, remote calibration is automatically performed from the calibration management system, and this remote calibration is an automatic function ultimately for keeping color tones printed in store operations consistent. At Level 3, a notification is output by e-mail every monitoring cycle. The operator at the store supplies a medium for common calibration to the printer, and the calibration performing task 302 automatically issues an instruction to perform calibration. Note that the server PC 1005 and the client PC 1004 according to the embodiment obtain values indicating the calibration statuses from the printers 1000 to 1003. The values can be calculated by the printers 1000 to 1003.

The system allows thresholds for Level 1, Level 2, and Level 3 to be set based on the values in accordance with the operations. The value indicating a calibration status changes depending on an amount of printing. These values are calculated by the printers 1000 to 1003. For example, a reference value is set based on an amount of printing and color tones that are measured under a certain condition, and the value is calculated based on the set reference value. In this embodiment, a dot count of ink ejected by a print head of a printer is used as an amount of printing; however, the amount of printing is not limited to this particular example and may be a time taken for printing or the like.

In response to pressing of a [Next] button 10004, the window changes to a window illustrated in FIG. 11. FIG. 11 is a window on which settings for monitoring the calibration statuses of the printers are set. A section 11000 allows a calibration task name or the like to be specified. A section 11001 allows whether or not to start the task immediately after the task has been registered to be specified. In this example, the calibration status monitoring unit 100 starts the task immediately after the definition of the task has been registered. At a field 11004 illustrated in FIG. 11, a destination of e-mail notification is registered for each calibration monitoring task. Sections 11002 and 11003 allow days of week and time on which the task is to be performed to be specified.

In the example illustrated in FIG. 11, one e-mail address is specified for one task; however, an e-mail address may be specified for each of printers associated with the task.

In response to pressing of a [Complete] button (not illustrated) lastly, the calibration status monitoring unit 100 registers the task.

As described above, settings for monitoring the printers 1000 to 1003 installed at the respective stores are completed through steps of M1 to M3. The printers 1000 to 1003 installed at the respective stores are monitored at timings specified when the task is defined.

Figure 12:
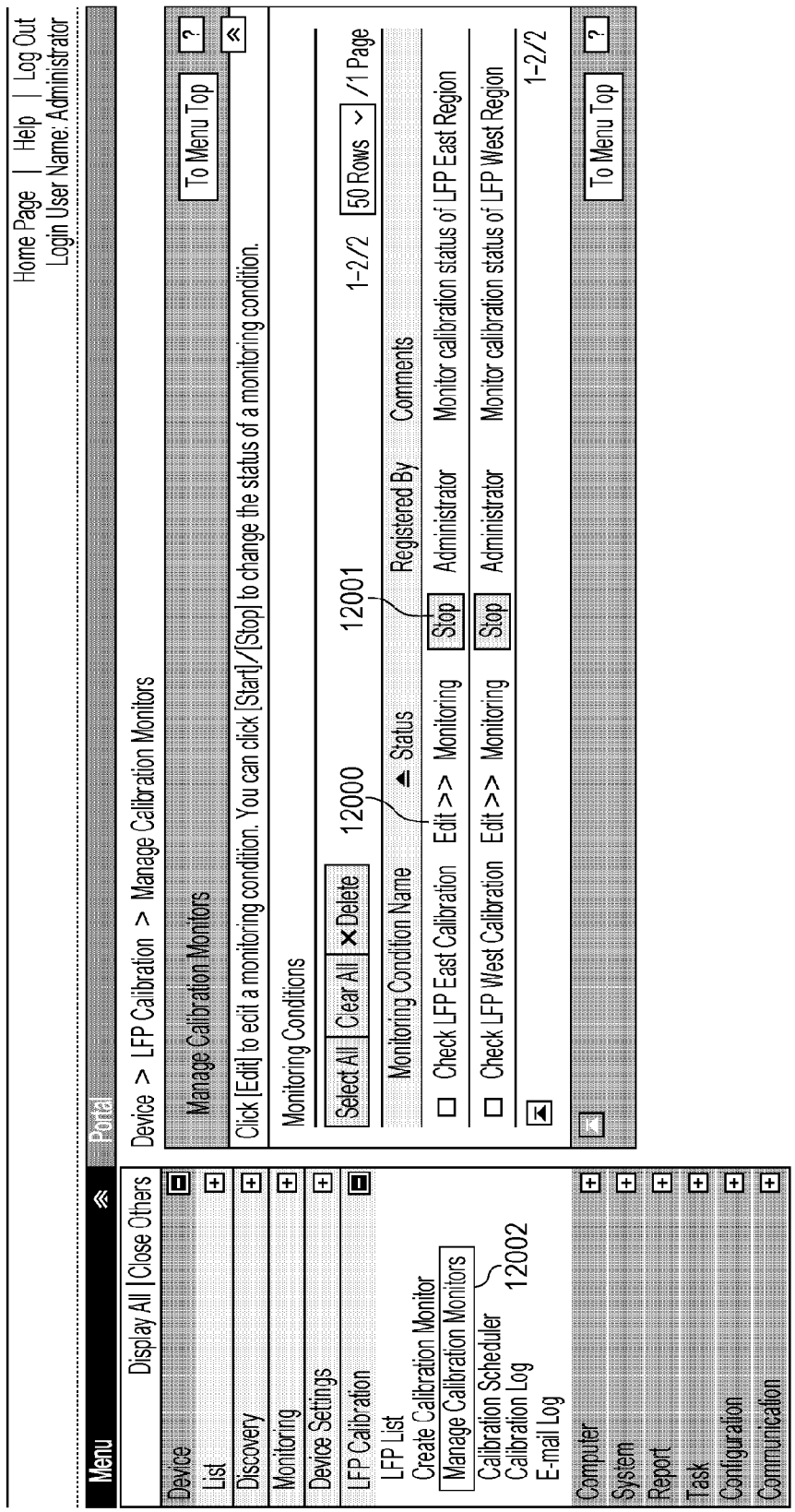
FIG. 12 is a diagram illustrating an example of a window on which a list of tasks registered by a calibration status monitoring unit is confirmed.

FIG. 12 illustrates a window on which a list of tasks registered by the calibration status monitoring unit 100 is confirmed. This window is displayed when a menu 12002 is selected.

Figure 13:
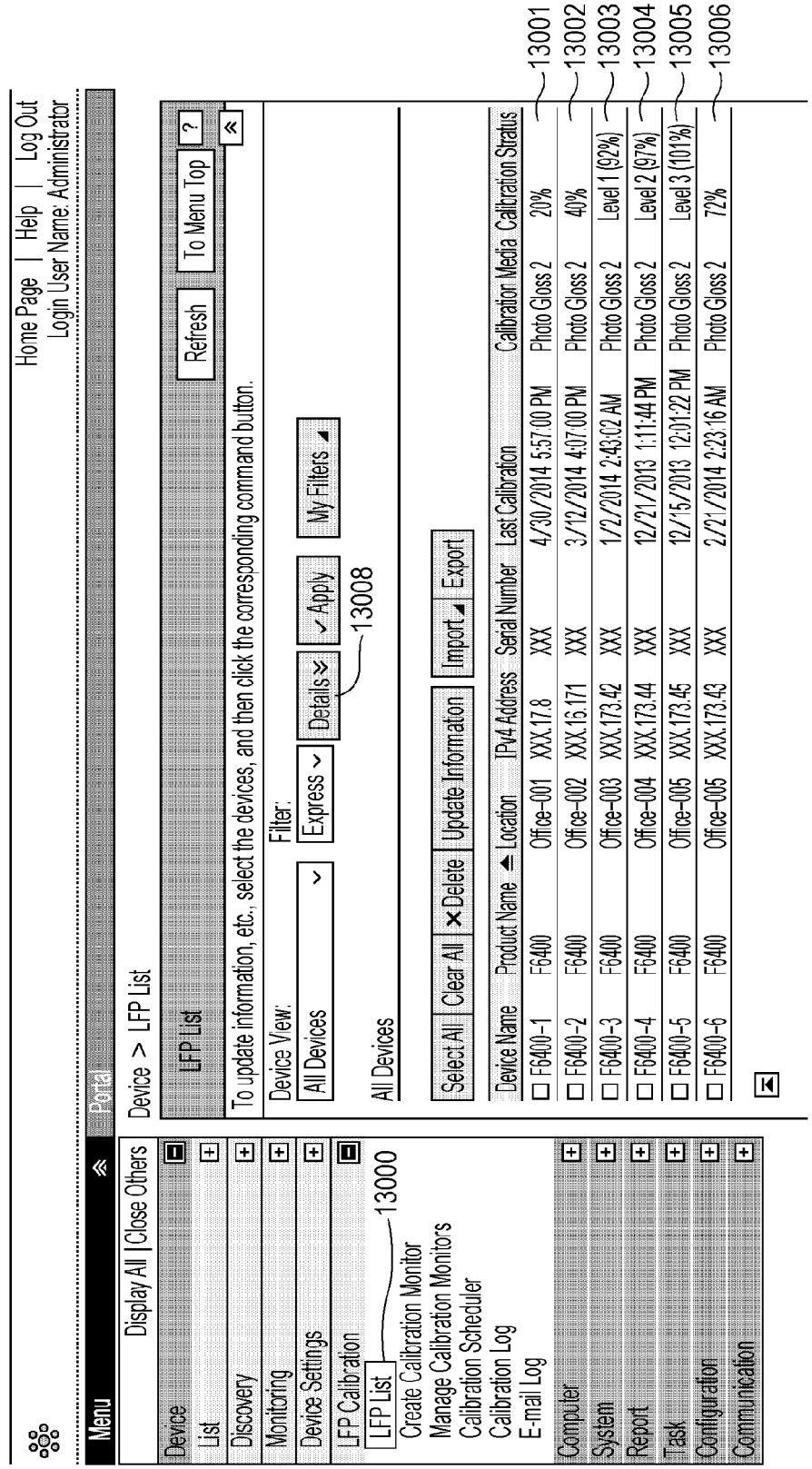
FIG. 13 is a diagram illustrating an example of a printer list.
Figure 14:
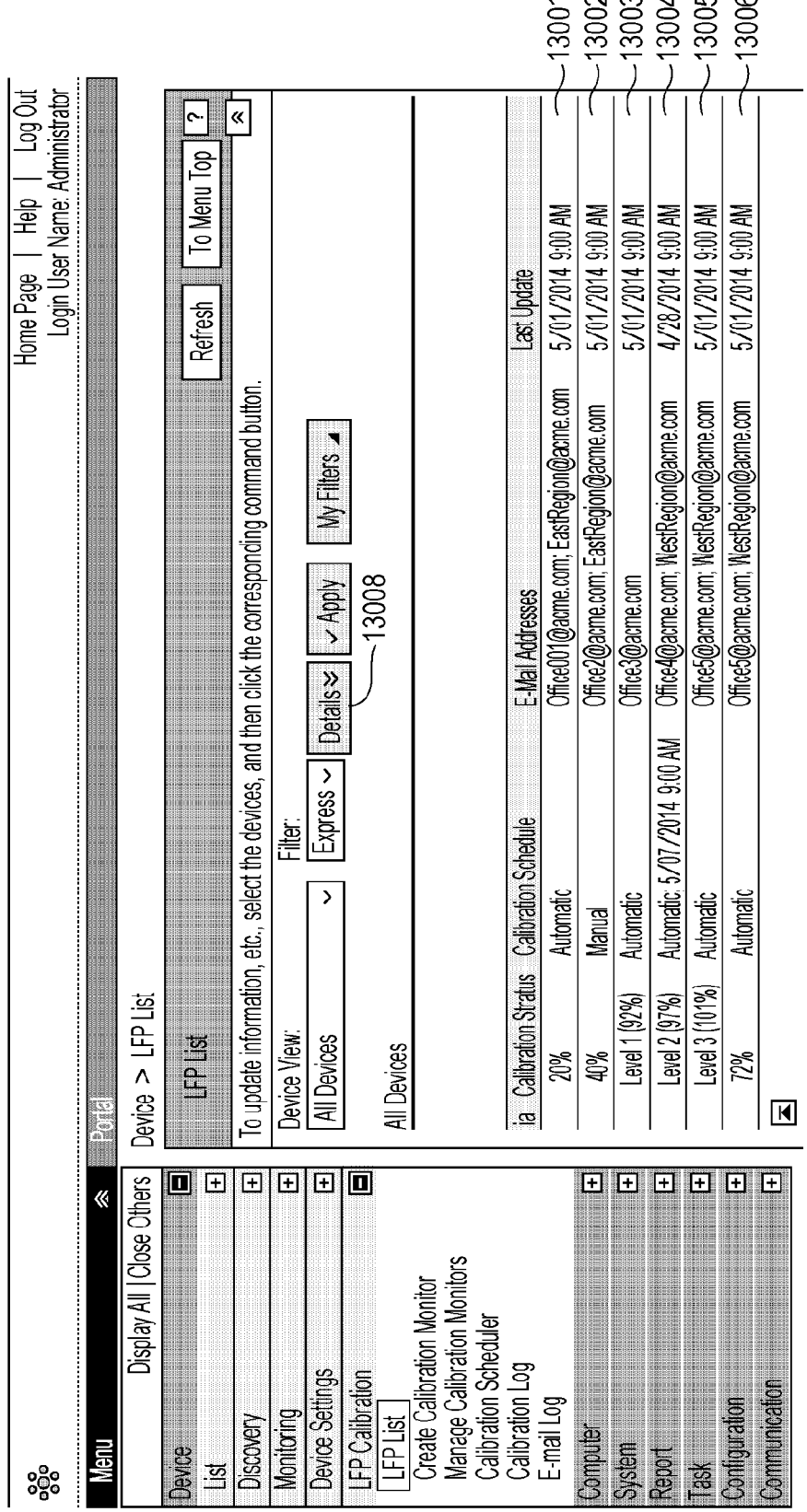
FIG. 14 is a diagram illustrating an example of a printer list.

The displayed window changes to the ones illustrated in FIGS. 10 and 11 in response to selection of an item 12000. In this way, conditions of the task can be re-edited. Further, with a button 12001, the task can be stopped or resumed. FIGS. 13 and 14 are diagrams illustrating an example of a list of printers. A window illustrated in FIG. 14 is obtained by performing horizontal scroll in FIG. 13. Rows 13001 to 13006 in FIG. 13 respectively correspond to rows 13001 to 13006 illustrated in FIG. 14.

For example, the row 13003 indicates that the calibration status of a printer F6400-3 is Level 1. Fig. 13 illustrates that paper "Photo Gloss 2" is used as media for common calibration. Here, information that has been registered in the printer in S3 of FIG. 6 is obtained and is stored in the printer list DB 401 illustrated in FIG. 5 by the task of the calibration status monitoring unit 100, and this information is read out and displayed. The calibration status for media illustrated in FIG. 14 will be described. The calibration status for media changes in a range of 0 to 100% depending on an amount of printing since the last calibration. In operations according to this embodiment, for example, Level 1 indicates 80%, Level 2 indicates 85%, and Level 3 indicates 90%.

The printer list DB 401 illustrated in FIG. 5 manages the following information.

| Model | S/N | IPv4 | Cal.Media | Cal.Status | Update |
|---|---|---|---|---|---|
| [Printer. A] | [000001] | [XXX.XXX.XXX.XXX] | [Photo] | [40] | 05/14/2014 9:00 |
| [Printer. B] | [000002] | [XXX.XXX.XXX.XXX] | [Photo] | [85] | 05/14/2014 9:05 |
| [Printer. C] | [000003] | [XXX.XXX.XXX.XXX] | [Photo] | [95] | 15/14/2014 9:10 |

A field "Model" indicates a product name of each of the printers 1000 to 1003. A field "S/N" indicates a serial number that is set for each of the printers 1000 to 1003 at the time of product shipment. A field "IPv4" indicates an IPv4 address. A field "Cal.Media" indicates a media type for use in common calibration that is configured in the printer as only one media type that can be used in common calibration. A field "Cal.Status" indicates a status for media for common calibration. A field "Update" indicates the date and time when the fields "Cal.Meida" and "Cal.Status" have been updated.

Figure 15:
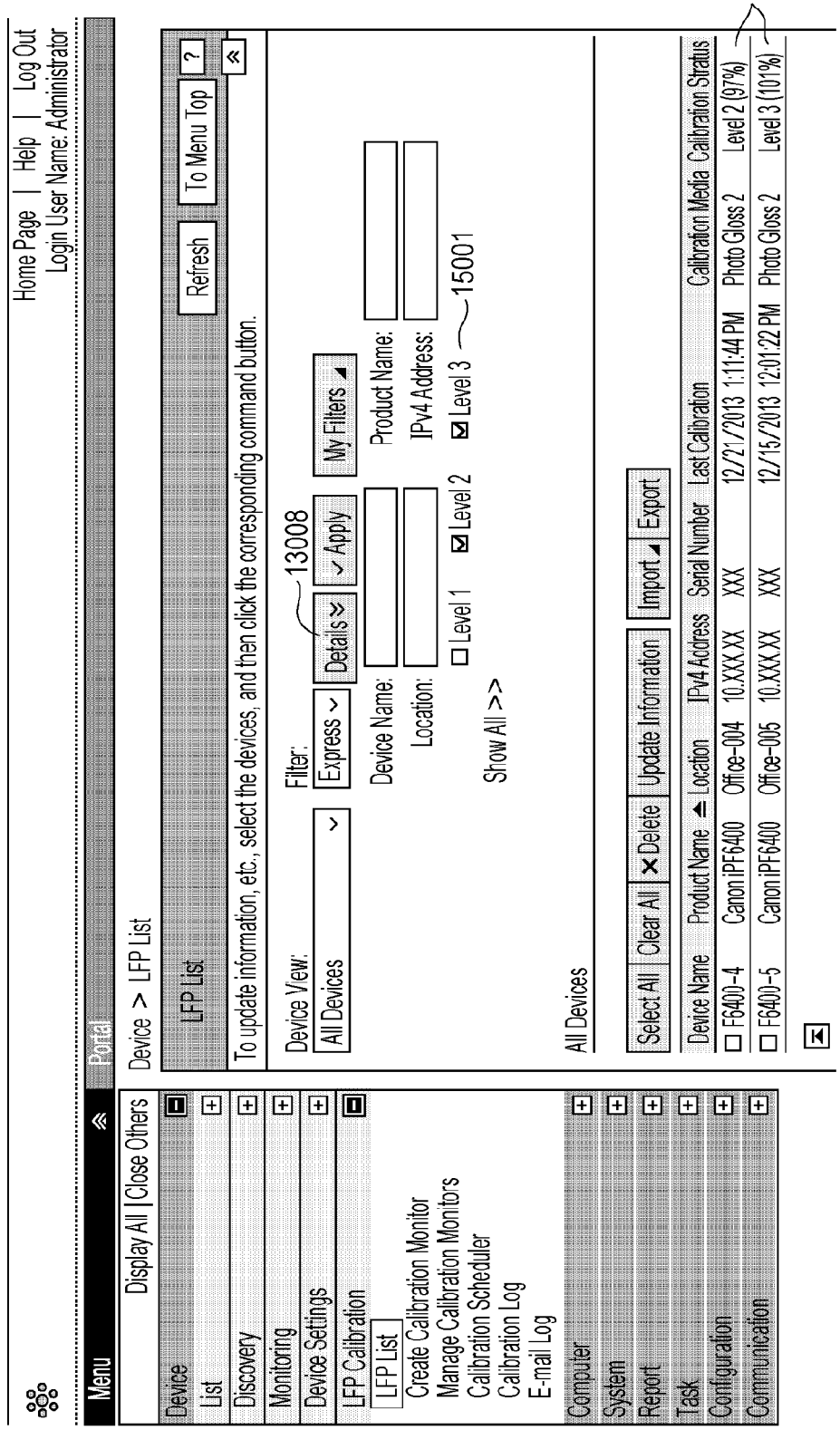
FIG. 15 is a diagram illustrating an example of a printer list.
Figure 16:
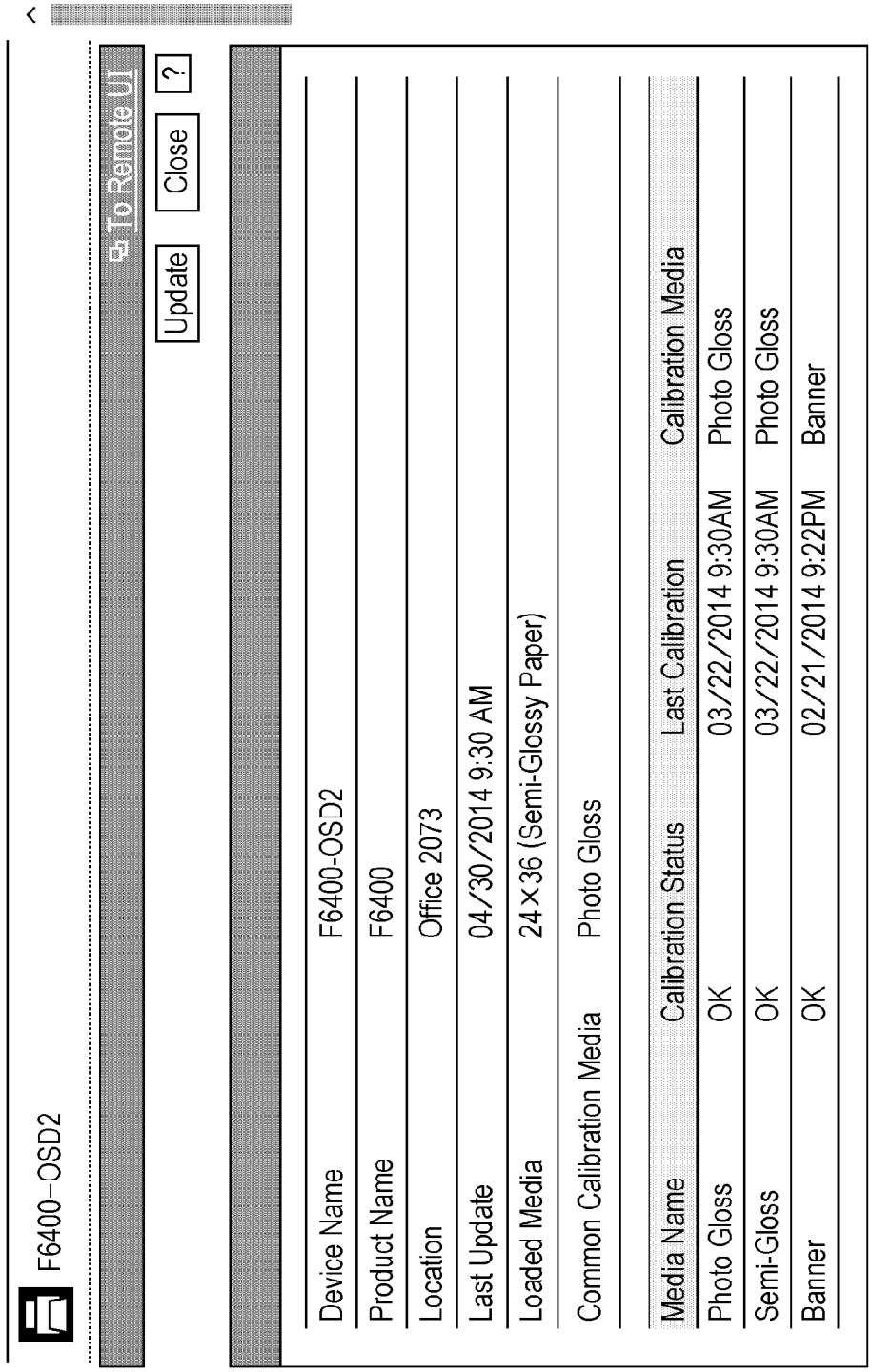
FIG. 16 is a diagram illustrating an example of a window showing details that is displayed when a printer is selected.
Figure 17:
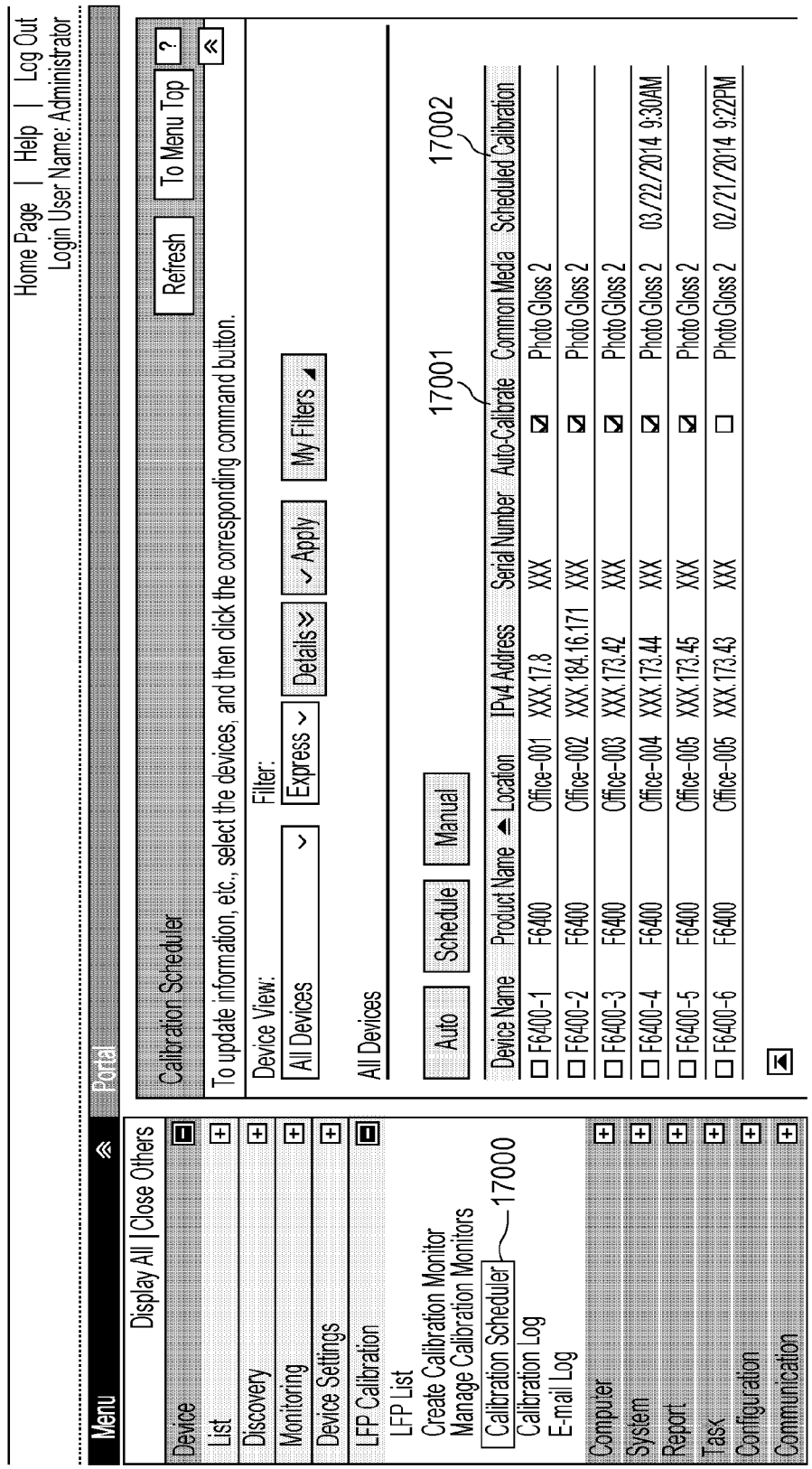
FIG. 17 is a diagram illustrating an example of a window displayed when a calibration scheduler menu is selected.

The information obtained by the task of the calibration status monitoring unit 100 is stored in the printer list DB 401 illustrated in FIG. 5. The information stored in the printer list DB 401 is converted into display information by the calibration status display unit 500. The display information is transmitted from the calibration status display unit 500 to a browser of the client PC 1004 in response to a request from the browser and is displayed on the CRT 11 of the client PC 1004. In response to pressing of a button 13008 in the state illustrated in FIG. 14, the window changes to a window illustrated in FIG. 15. FIG. 15 is a diagram illustrating an example of a printer list. Here, filtering can be performed on devices based on various items illustrated in FIG. 15. FIG. 15 illustrates the state in which printers assigned Level 2 and Level 3 are checked with a checkbox 15001. FIG. 16 is a window of details that is displayed when one printer is selected from the list of printers illustrated in a section 15002 in FIG. 15 or the like. FIG. 17 illustrates a window that is displayed when a calibration scheduler menu 17000 is selected. An item 17001 illustrated in FIG. 17 allows a user to specify whether or not to perform automatic calibration. An item 17002 allows a user to schedule calibration by specifying the time. In this system, automatic management is a default function, and scheduled or manual management is a sub-function of the automatic management. For example, the priorities are set in such a manner that automatic management>scheduled management>manual management.

In the case of automatic management, calibration is performed when the calibration status information has reached the threshold (of Level 3 herein). In the case of scheduled management, calibration is performed when a specified time has reached. In the case of manual management, calibration is performed in response to an instruction given by a user.

The task of the calibration status monitoring unit 100 has, as an optional setting for monitoring, a function for retrieving media types registered in each printer and verifying that the number of media types that can be used in common calibration among media types displayed on the printer control panel is one. If the number of media types is not one, an error notification is transmitted by e-mail to a destination specified in the field 11004 illustrated in FIG. 11.

The task of the calibration status monitoring unit 100 monitors, for each of printers belonging to the group, the calibration status for the one media type that can be used in common calibration. It is assumed here that the printers 1000 and 1003 are associated with the task of the calibration status monitoring unit 100. An operation for monitoring the calibration status of the plurality of printers for the one media type that can be used in common calibration is as follows.

Figure 19:
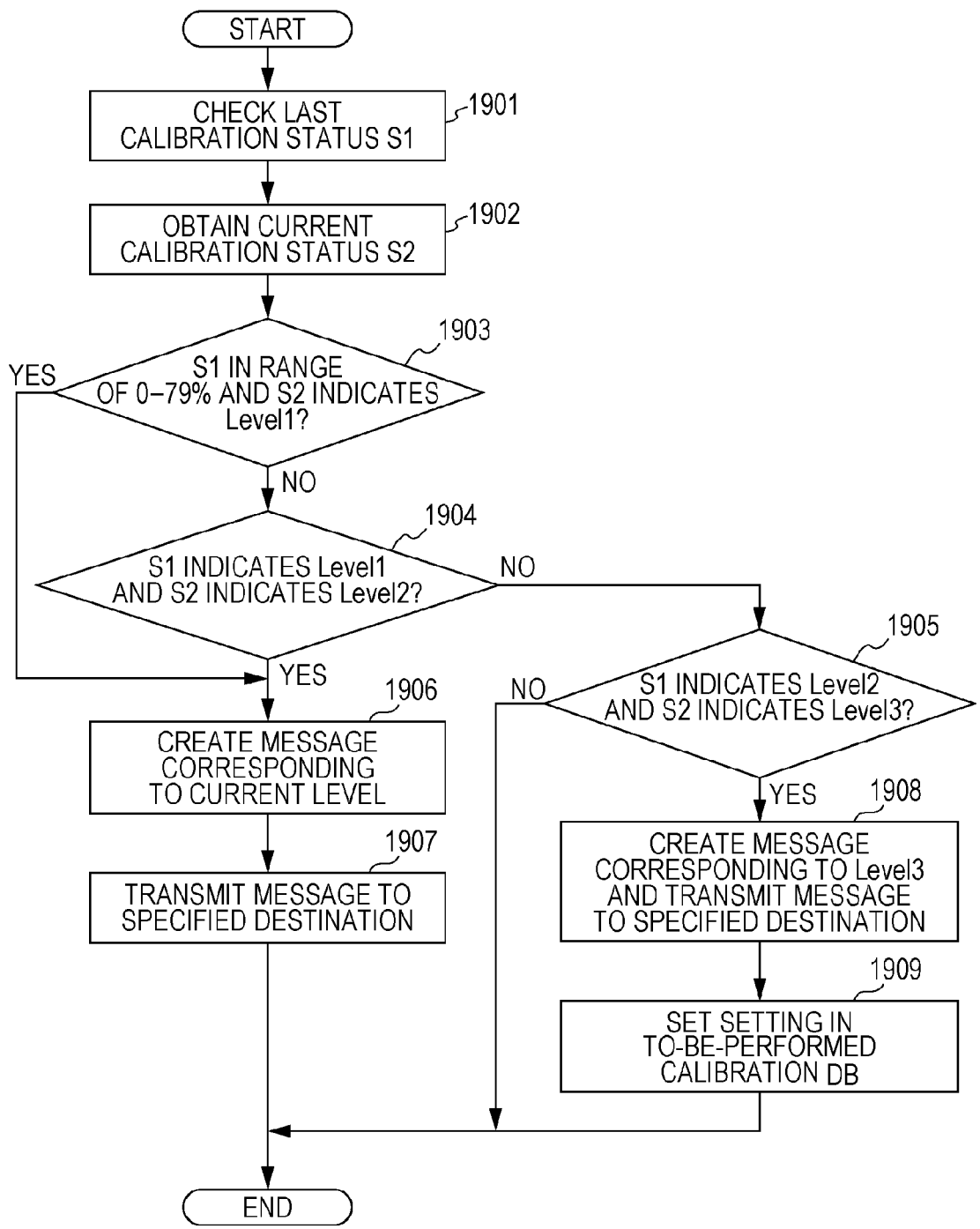
FIG. 19 is a diagram illustrating an example of a control flow of monitoring of a calibration status of a printer.

First, the following process is performed for a printer of interest that is yet to be processed. FIG. 19 is a control flow of monitoring the calibration status of a printer. This control flow is performed as a result of the CPU 1 of the server PC 1005 loading a control program stored in the external memory 12 into the RAM 2 and executing the control program.

In step 1901, a last calibration status S1 is checked. In step 1902, a current calibration status S2 is obtained from the printer.

If it is determined in step 1903 that the last calibration status S1 is in a range of 0 to 79% and the current calibration status S2 indicates Level 1, the process proceeds to step 1906; otherwise, the process proceeds to step 1904.

If it is determined in step 1904 that the last calibration status S1 indicates Level 1 and the current calibration status S2 indicates Level 2, the process proceeds to step 1906; otherwise, the process proceeds to step 1905.

In step 1906, a message prepared in advance in accordance with the current status is created. In step 1907, the message is transmitted by e-mail to a destination specified in advance.

If it is determined in step 1905 that the last calibration status S1 indicates Level 2 and the current calibration status S2 indicates Level 3, the process proceeds to step 1908; otherwise, the process ends. In step 1908, a message corresponding to Level 3 is created and is transmitted by e-mail to a specified destination. The process then proceeds to step 1909, in which to-be-performed calibration information for the printer is set in the to-be-performed calibration DB 600 illustrated in FIG. 5, and then process ends. Here, the to-be-performed calibration DB 600 is a DB that manages information indicating that calibration needs to be performed. Note that in step 1904, the last calibration status S1 may be in a range of 0 to 79%. In addition, in step 1905, the last calibration status S1 may be in a range of 0 to 79% or indicates Level 1.

The to-be-performed calibration DB 600 illustrated in FIG. 5 manages the following information.

| Model | S/N | Auto | Schedule | Manual |
|---|---|---|---|---|
| [Printer. A] | [000001] | [Yes] | [No] | [No] |
| [Printer. B] | [000002] | [No] | [Yes] | [No] |
| [Printer. C] | [000003] | [No] | [No] | [No] |

A field "Model" contains the same information as that contained in the field "Model" of the printer list DB 401. A field "S/N" contains the same information as that contained in the field "S/N" of the printer list DB 401. Note that the field "S/N" contains information that is unique in the to-be-performed calibration DB 600 and the printer list DB 401 and that uniquely identifies a printer. "Yes" at a field "Auto" indicates that automatic calibration is needed. "Yes" at a field "Schedule" indicates that scheduled calibration is needed. "Yes" at a field "Manual" indicates that manual calibration is needed. "No" at the fields "Auto", "Schedule", and "Manual" indicates that calibration is not needed. At the field "Schedule", scheduled start time information is set as additional information, for example. The scheduled start time information is used to determine that calibration is cancelled if, for example, 30 minutes have passed from the scheduled start time when calibration is started.

In the case where [Yes] is set at the fields "Auto", "schedule", and "Manual", the task functions in the following manner.

1) Because [Yes] is set at the field "Auto", calibration is performed.
2) [Yes] is changed to [No] at the field "Auto".
3) Because [Yes] is set at the field "Schedule", calibration is performed.
4) [Yes] is changed to [No] at the field "Schedule".
5) Because [Yes] is set at the field "Manual", calibration is performed.
6) [Yes] is changed to [No] at the field "Manual".

It is considered that the fields "Schedule" and "Manual" indicate an explicit intention of an administrator of the calibration management system. Accordingly, calibration is further performed even after automatic calibration has been performed.

Thereafter, the processing of steps 1901 to 1909 described above is repeatedly performed for the plurality of printers yet to be processed. Note that the above-described case is an example of a case where a destination to which a message is to be transmitted by e-mail can be defined for each printer. That is, there may be a case where a plurality of e-mails are transmitted. In the case where a destination to which a message is to be transmitted by e-mail is defined for each task as illustrated in FIG. 11, messages created in steps 1906 and 1908 may be transmitted as one message to the specified destination.

In the case where the current calibration status S2 indicates Level 1 or Level 2 which is the same as the last calibration status S1, a notification is made by e-mail once for the first one. In the case of Level 3, a notification may be made by e-mail every monitoring cycle of the calibration status monitoring unit 100 illustrated in FIG. 5.

Operation of To-be-performed Calibration DB Monitoring Unit 301 in FIG. 5

The to-be-performed calibration DB monitoring unit 301 monitors the to-be-performed calibration DB 600 illustrated in FIG. 5 at regular intervals. Upon finding a printer for which calibration needs to be performed, the to-be-performed calibration DB monitoring unit 301 creates the calibration performing task 302 illustrated in FIG. 5 for the printer.

Operation of Calibration Performing Task 302 in FIG. 5

Figure 20:
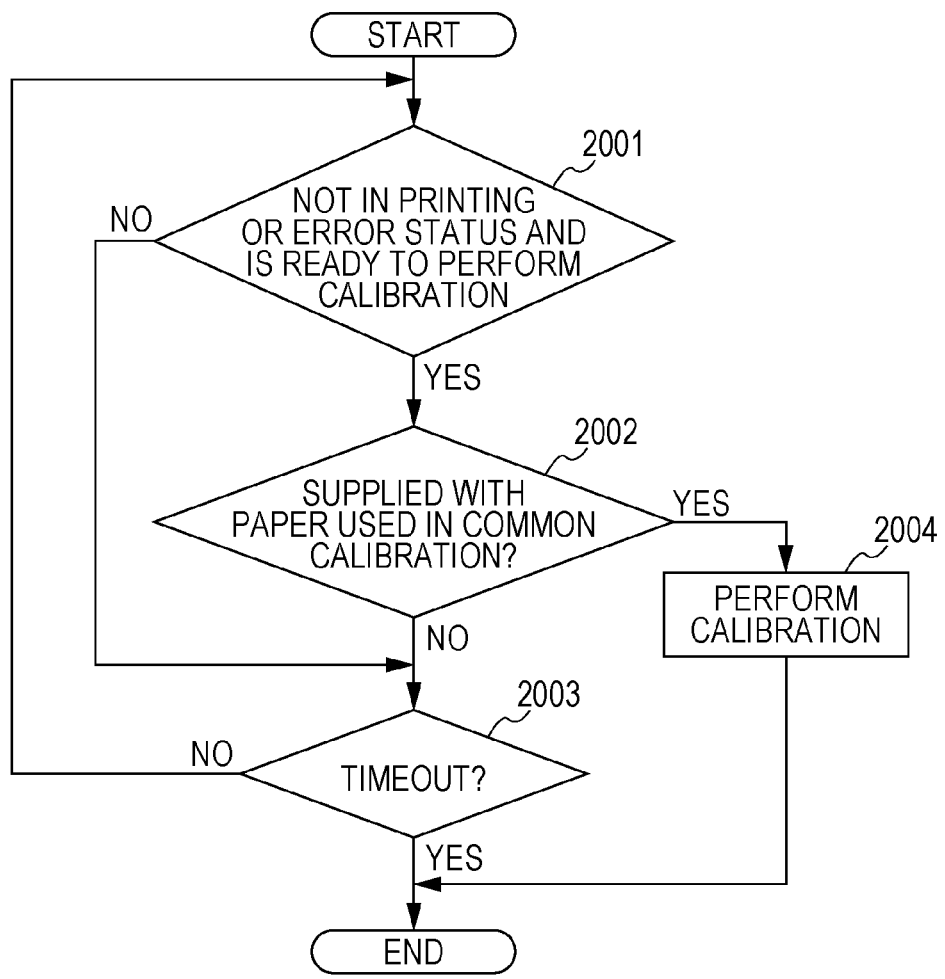
FIG. 20 is a diagram illustrating an example of a control flow of a calibration performing task.

In the following description, the calibration performing task 302 performs the following processing. FIG. 20 illustrates a control flow performed by the calibration performing task 302. The control flow is performed as a result of the CPU 1 of the server PC 1005 loading a control program stored in the external memory 12 into the RAM 2 and executing the control program.

The calibration performing task 302 determines whether the printer is ready to perform calibration in step 2001. If the print is in a printing or error state, it is determined the printer is not ready to perform calibration. If it is determined that the printer is not ready to perform calibration, in other words, the printer is in the printing or error state, the process proceeds to step 2003. If it is determined that the printer is not in the printing or error state and is ready to perform calibration, the process proceeds to step 2002. In step 2002, the calibration performing task 302 performs detection and determines whether a medium of a type that can be used in common calibration is fed. If the determination result indicates YES, the process proceeds to step 2004 in which calibration is performed. If the determination result indicates NO, the process proceeds to step 2003. In step 2003, the calibration performing task 302 determines whether or not a timeout has occurred. If it is determined that a timeout has not occurred, the process returns to step 2001. If it is determined that a timeout has occurred, the process ends. In step 2004, the calibration performing task 302 instructs the printer to perform calibration so as to cause the printer to perform calibration.

Alternatively, the control flow may be configured in the following manner. The calibration performing task 302 detects whether the printer is not in a printing or error state and is ready to perform calibration and detects whether a medium of a type that can be used in common calibration is fed. The calibration performing task 302 detects the status of the printer at regular intervals until a medium of a type that can be used in common calibration is fed. A timeout time up until a medium that can be used in common calibration is fed is set in advance as information of the system. If a timeout for starting calibration occurs, calibration is not performed this time. If a need to perform calibration is detected as the calibration status through the next monitoring cycle of the calibration status monitoring unit 100 illustrated in FIG. 5, "Yes" is written again at the field "Auto" in the to-be-performed calibration DB 600 illustrated in FIG. 5. Thereafter, the to-be-performed calibration DB monitoring unit 301 illustrated in FIG. 5 detects the field "Auto" of the to-be-performed calibration DB 600 illustrated in FIG. 5, and creates the calibration performing task 302 illustrated in FIG. 5 again.

The calibration status monitoring unit 100 illustrated in FIG. 5 may include, as an optional setting of monitoring, a function for retrieving media types registered in the printers 1000 to 1003 and verifying whether the number of media types that can be used in common calibration among the media types displayed on the panel is one. If the number of media types is not one, a destination specified in advance may be notified of an error by e-mail. Further, the calibration status monitoring unit 100 illustrated in FIG. 5 may monitor, for each of printers belonging to a group, the calibration status for a media type that can be used in common calibration.

FIG. 18 illustrates a window displayed when a menu "Calibration Log" 18001 is selected. Contents of operations performed by the calibration status monitoring unit 100 and the calibration performing task 302 illustrated in FIG. 5 are recorded as a log and are displayed as illustrated in FIG. 18. At a "Device Status" field 18002, information such as "calibration completed", "calibration failure", "notification of Level 1, Level 2, or Level 3", or occurrence of a timeout in step 2003 of FIG. 20 is displayed.

FIG. 23 is a window with which media information is updated in a printer driver or a printer. When a printer driver is updated, the client PC 1004 can instruct the printer 1000 to update custom media information at the same time. If a checkbox [Clear all media information in the printer and update it] 2301 is checked, media types registered in the printer are synchronized with media types registered in the PC in response to update in the printer driver. For example, a media type that is registered in the printer but is not registered in the PC is subjected to a media type deleting operation performed in the printer 1000.

As described above, in the case where large-format printers which are examples of printers are used in business at respective stores, media types that can be used in calibration and media types that cannot be used in calibration are utilized in accordance with the contents of services provided at the stores. Accordingly, one media type that can be used in common calibration is selected from among the media types that can be used in calibration, and calibration is performed. In this way, color tones printed by the printers installed at the respective stores can be kept consistent, and the procedure employed at the respective stores can be made identical.

As described above, the following is disclosed as an example of this embodiment. A media type for which calibration is performed is registered. A need for calibration is determined based on the registered information. Calibration is performed if there is a need for calibration. Individual elements may be included in a printer or a host that accesses the printer.

In a first exemplary configuration, there is provided an operation information registering unit configured to register in a printing system information concerning media types to be used in calibration from among a plurality of media types. The operation information registering unit includes a media information generation unit configured to set a single common calibration media type from among the media types registered in a printer.

In another embodiment, information for setting calibration to be performed may be set in the information concerning media types.

In another embodiment, media types to be used in calibration may be registered in a calibration system.

In a second exemplary configuration, there is provided a calibration status monitoring unit configured to detect a media type used to determine a calibration status, by referring to the information registered by the operation information registering unit and configured to determine whether calibration for the detected media type is needed.

In another embodiment, the calibration status monitoring unit includes a function for detecting a single common calibration media type that is registered in a printer by a calibration management system and for determining the status.

In another embodiment, the calibration status monitoring unit may determine the calibration status by referring to registered calibration operation information registered in the calibration management system.

In a third exemplary configuration, there is provided a calibration instructing unit configured to give an instruction to perform calibration based on the determination made by the calibration status monitoring unit.

In an embodiment, the calibration instructing unit includes a function for giving an instruction to perform calibration if a medium of the media type determined with the second exemplary configuration can be fed or is fed.

Other Embodiments

The configuration of the embodiment of the present invention is not limited to the configurations described above. For example, in the embodiment described above, the client PC 1004 registers, in a printer, information concerning a media type for which calibration is performed. However, the server PC 1005 may register such information. In addition, in the embodiment described above, the server PC 1005 determines whether a printer is supplied with a medium of a type used in common calibration. However, the configuration is not limited to this configuration, and this determination may be performed by each printer.

Embodiment(s) of the present invention can also be realized by a computer of a system or apparatus that reads out and performs computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and perform the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A control system that monitors a calibration status of a printer, comprising:
    an obtaining unit configured to obtain information that identifies a common media type to be used in calibration by a printer serving as a monitoring target, the printer being capable of using a plurality of media types, a result of calibration performed using the common media type being applied to another media type;
    a first determining unit configured to determine whether a calibration status of the printer satisfies a first condition in accordance with a printing amount of the printer;
    a second determining unit configured to determine whether a recording medium corresponding to the common media type is held in the printer by using the information obtained by the obtaining unit; and
    a control unit configured to cause the printer to perform calibration by causing the printer to perform printing on the recording medium corresponding to the common media type in a case where the first determining unit determines that the calibration status of the printer satisfies the first condition and the second determining unit determines that the recording medium corresponding to the common media type is held in the printer.

2. The control system according to claim 1, further comprising a specifying unit configured to specify the common media type.

3. The control system according to claim 1, further comprising a management unit configured to manage information concerning a media type that is usable by a printer serving as a monitoring target.

4. The control system according to claim 3, further comprising an adding unit configured to add a media type for use in calibration by a printer serving as a monitoring target, wherein
    the management unit manages information concerning the media type that has been added by the adding unit in response to addition of the media type.

5. The control system according to claim 4, further comprising a creation unit configured to create a calibration target value for the media type that has been added by the adding unit.

6. The control system according to claim 3, wherein the management unit registers the common media type in a memory of a printer serving as a monitoring target.

7. The control system according to claim 6, wherein the management unit registers a single media type serving as the common media type in a plurality of printers serving as monitoring targets.

8. The control system according to claim 3, wherein the management unit registers information concerning a media type that is usable by a printer serving as a monitoring target in a memory of the printer.

9. The control system according to claim 1, wherein the obtaining unit obtains the information from the printer.

10. The control system according to claim 1, further comprising
    a monitoring unit configured to monitor calibration statuses of a plurality of printers serving as monitoring targets, wherein
    the monitoring unit includes the first determining unit.

11. The control system according to claim 10, further comprising a display control unit configured to cause a display to display the calibration statuses of the printers monitored by the monitoring unit for the common media type.

12. The control system according to claim 11, wherein the display control unit causes the display to display the calibration statuses of the printers monitored by the monitoring unit for the common media type by using a plurality of levels.

13. The control system according to claim 1, wherein the control unit causes the printer to perform calibration in a case where the second determining unit determines that a recording medium corresponding to the common media type is held in the printer and the printer is ready to perform calibration.

14. The control system according to claim 1, wherein the first determining unit determines whether a printing amount of the printer is greater than or equal to a first threshold as the first condition.

15. The control system according to claim 14, wherein the first determining unit further determines the printing amount of the printer is greater than or equal to a second threshold as the second condition, the second threshold being smaller than the first threshold, and the control system further comprises
    a notifying unit configured to output a notification in a case where the printing amount of the printer is the second threshold or more.

16. The control system according to claim 14, wherein the notifying unit outputs a notification to an external apparatus associated with the printer serving as a monitoring target.

17. The control system according to claim 16, wherein the notifying unit outputs, by email, a notification to an external apparatus associated with the printer serving as a monitoring target.

18. The control system according to claim 14, further comprising a setting unit configured to set a destination to which a notification is output by the notifying unit.

19. The control system according to claim 1, wherein the control system monitors a plurality of printers.

20. A control apparatus that monitors a calibration status of a printer, comprising:
   an obtaining unit configured to obtain information that identifies a common media type to be used in calibration by a printer serving as a monitoring target, the printer being capable of using a plurality of media types, a result of calibration performed using the common media type being applied to another media type;
   a first determining unit configured to determine whether a calibration status of the printer satisfies a certain condition in accordance with a printing amount of the printer;
   a second determining unit configured to determine whether a recording medium corresponding to the common media type is held in the printer by using the information obtained by the obtaining unit; and
   a control unit configured to cause the printer to perform calibration by causing the printer to perform printing on the recording medium corresponding to the common media type in a case where the first determining unit determines that the calibration status of the printer satisfies the certain condition and the second determining unit determines that the recording medium corresponding to the common media type is held in the printer.

21. A control method for monitoring a calibration status of a printer, comprising:
   obtaining information that identifies a common media type to be used in calibration by a printer serving as a monitoring target, the printer being capable of using a plurality of media types, a result of calibration performed using the common media type being applied to another media type;
   determining whether a calibration status of the printer satisfies a certain condition in accordance with a printing amount of the printer;
   determining whether a recording medium corresponding to the common media type is held in the printer by using the information obtained by the obtaining unit; and
   causing the printer to perform calibration by causing the printer to perform printing on the recording medium corresponding to the common media type in a case where it is determined that the calibration status of the printer satisfies the certain condition and it is determined that the recording medium corresponding to the common media type is held in the printer.

22. A non-transitory computer-readable storage medium storing thereon a program causing a computer to perform the control method according to claim 21.

* * * * *